United States Patent [19]

Meyer et al.

[11] Patent Number: 5,742,504
[45] Date of Patent: Apr. 21, 1998

[54] METHOD AND SYSTEM FOR QUICKLY DEVELOPING APPLICATION SOFTWARE FOR USE IN A MACHINE VISION SYSTEM

[75] Inventors: Frank Meyer, Wootton; Frederico P. de Magalhaes, Bedford; Benjamin J. Chappel, Bucks; Christopher J. Cooper, Herts, all of England

[73] Assignee: Medar, Inc., Farmington Hills, Mich.

[21] Appl. No.: 554,188

[22] Filed: Nov. 6, 1995

[51] Int. Cl.$^6$ ............................................. G05B 9/02
[52] U.S. Cl. .................. 364/188; 364/191; 364/474.23; 395/94; 395/99
[58] Field of Search ........................... 364/188, 513, 364/191, 474.23; 395/700, 99, 706, 705

[56] References Cited

U.S. PATENT DOCUMENTS

| | | | |
|---|---|---|---|
| 4,462,046 | 7/1984 | Spight | 358/101 |
| 4,679,137 | 7/1987 | Lane et al. | 364/188 |
| 4,759,074 | 7/1988 | Iadipaolo et al. | 382/23 |
| 4,833,624 | 5/1989 | Kuwahara et al. | 364/513 |
| 4,914,567 | 4/1990 | Lipkis et al. | 364/188 |
| 4,922,434 | 5/1990 | Fule | 364/513 |
| 4,928,313 | 5/1990 | Leonard et al. | 382/8 |
| 5,005,119 | 4/1991 | Rumbaugh et al. | 364/200 |
| 5,095,204 | 3/1992 | Novini | 250/223 |
| 5,170,352 | 12/1992 | McTamaney et al. | 364/424.02 |
| 5,314,055 | 5/1994 | Gordon | 198/395 |
| 5,327,350 | 7/1994 | Endo | 364/474.21 |
| 5,383,110 | 1/1995 | Fujita et al. | 364/191 |
| 5,414,812 | 5/1995 | Filip et al. | 395/200 |
| 5,416,392 | 5/1995 | Lee et al. | 318/516.1 |
| 5,434,629 | 7/1995 | Pearson et al. | 348/721 |
| 5,453,933 | 9/1995 | Wright et al. | 364/473.23 |
| 5,481,712 | 1/1996 | Silver et al. | 395/700 |
| 5,500,906 | 3/1996 | Picard et al. | 382/220 |
| 5,511,147 | 4/1996 | Abdel-Malek | 395/99 |
| 5,517,663 | 5/1996 | Kahn | 395/800 |
| 5,530,643 | 6/1996 | Hodorowski | 364/191 |
| 5,555,365 | 9/1996 | Selby et al. | 395/159 |
| 5,574,828 | 11/1996 | Hayward et al. | 395/50 |
| 5,581,769 | 12/1996 | Wallace et al. | 395/684 |
| 5,594,657 | 1/1997 | Cantone et al. | 364/490 |
| 5,603,058 | 2/1997 | Belknap et al. | 395/855 |

OTHER PUBLICATIONS

Teoh, E. K. et al., "an Intelligent Robotics Vision System—Automatic keyboard Assembly", 1987 IEEE Region 10 Conference, Aug. 1987, pp. 550–554, Feb. 1987.

Rumbaugh, "A Data Flow Multiprocessor", IEEE Transactions on computers, vol. c–26, No. 2, Feb. 1977.

Rochkind, "The Source Code Control System", IEEE Trans. on Software Engineering, vol. SE–1, pp. 364–370, Nov. 4, 1975.

(List continued on next page.)

*Primary Examiner*—Reba I. Elmore
*Assistant Examiner*—Ramesh Patel
*Attorney, Agent, or Firm*—Brooks & Kushman P.C.

[57] ABSTRACT

A method and system are provided for quickly developing application software for use in a machine vision system using a computer system. Hardware operating parameters are stored which correspond to possible hardware for use in the machine vision system. The hardware operating parameters define a set of custom controls having properties. Commands and a set of instructions are received from a user of the computer system to select a first custom control program corresponding to a desired component, desired hardware operating parameters corresponding to desired hardware and a second custom control program corresponding to a desired machine vision algorithm. The first custom control program is linked with the desired hardware operating parameters to the second custom control program to form the application software. The step of linking includes the step of setting the property of one custom control to be equal to one property of another custom control to form the application software in response to the commands and a set of user supplied instructions.

30 Claims, 31 Drawing Sheets

OTHER PUBLICATIONS

Rosenau, Jr., "Project Management for Engineers", pp. 89-105, Van Nostrand Reinhold Company.

"An Intelligent Camera for Active Vision" L.F. Pan Vision, SME, Third Quarter 1995, vol. 11, No. 3, pp. 6 & 7.

"Machine Vision Software Right Off the Shelf", J.E. Lecky, Sensors, Sep., 1994.

XCaliper, "The Precision Measurement Tools for Windows" and The Non-Contact Measurement and Gauging Tool for Windows, Xipis, Inc.

"Photonics At Work", Reprint from Photonics Spectra, Jan. 1994.

Brochure entitled "Prophecy/SherlockPro", published by Intelec Corporation.

Professional Edition of "Vision Basic", Programming System for Windows, published by Microsoft Corporation.

Fig. 20

| | 1 | 2 |
|---|---|---|
| Area | 193 | 174 |
| Perimeter | 83 | 71 |
| Angle | -1 | 0 |
| Squarness | 0 | 0 |
| Length | 25 | 25 |
| XMin | 384 | 284 |

Total Area 2321

Execution

N. Results 51

Fig. 27

METHOD AND SYSTEM FOR QUICKLY DEVELOPING APPLICATION SOFTWARE FOR USE IN A MACHINE VISION SYSTEM

TECHNICAL FIELD

This invention relates to methods and systems for developing application software for use in a machine vision system.

BACKGROUND ART

Application software is the cornerstone of every successful vision system job and normally accounts for the majority of the development effort.

At one extreme there are general purpose vision systems for generic gauging, verification, or flaw detection applications. These systems come with a standard interface configurable with a keyboard and mouse.

Successful applications most often require software changes to cope with individual site requirements. Most general purpose systems are closed, or difficult to modify. Others can only be reconfigured through various programming languages.

There is a need to configure and customize the application in the shortest time, yet provide powerful algorithms. Some systems can be modified using "C". Some require one to learn the supplier's proprietary language. Hiring "C" experts, or taking the time to learn yet another language, is expensive and time consuming.

Many times generic vision systems are not the answer, so one must build a custom system using a frame grabber or fast vision hardware. Software is typically the most difficult and time-consuming task of any programmable vision system. At best, the board comes with a library of "C" calls or more often a way to program the board at the register level. Not only does one have to program the application and design a Windows interface, one must understand the performance characteristics of the board and its behavior so one can write algorithms that maximize speed. This is a complicated task for someone trying to solve a problem in the shortest period of time.

Typically, this process takes man-years—not man-months. The only vision system developer that can afford this option is one that amortizes engineering over hundreds of systems. With today's frequency of product improvements, even OEMs are having a hard time justifying this approach.

The Intelec Corporation of Williston, Vt. sells a Windows-based software development package that allows users to create machine vision applications and handle a range of machine vision functions. The software provides a dynamic link library interface which allows the end user to add special purpose algorithms for image processing and analysis.

Xiris, Inc. of Burlington, Ontario, Canada makes a software package including image processing algorithms. The package is configured as a Visual Basic Extension (VBX) to allow the building of automatic inspection applications.

SUMMARY OF THE INVENTION

An object of the present invention is to provide a method and system for quickly developing application software for use in a machine vision system.

Another object of the present invention is to provide a method and system for simply and flexibly developing application software for use in a machine vision system with a graphical user interface such as Windows interface.

Yet another object of the present invention is to provide a method and system for developing application software for use in a machine vision system without the need to develop core vision algorithms and/or complex calibration techniques.

Still another object of the present invention is to provide a cost-effective method and system for developing application software for use in a machine vision system using standard PC hardware and a frame grabber or vision processor while providing a graphical user interface, such as a Windows interface.

In carrying out the above objects and other objects of the present invention, a method is provided for quickly developing application software for use in a machine vision system using a computer system. The method includes the step of storing an application development program, including a first set of custom control programs representing possible components of a user interface for the machine vision system. The first set of custom control programs define a first set of custom controls. The method also includes the step of storing a second set of custom control programs representing possible machine vision algorithms for the machine vision system. The second set of custom control programs define a second set of custom controls. The method further includes the step of storing hardware operating parameters corresponding to possible hardware for use in the machine vision system. The hardware operating parameters define a third set of custom controls. The method further includes the step of displaying a graphical representation of the possible components, the possible hardware and the possible machine vision algorithms. Then, the method includes the step of receiving commands from a user of the computer system to select a first custom control program corresponding to a desired component of the user interface, desired hardware operating parameters corresponding to desired hardware and a second custom control program corresponding to a desired machine vision algorithm. Finally, the method includes the step of linking the first custom control program with the desired hardware operating parameters to the second custom control program to form the application software in response to the commands.

Further in carrying out the above objects and other objects of the present invention, a system is provided for carrying out the method steps.

The benefits accruing to the method and system of the present invention are numerous. For example, the method and system:

Simplify and accelerate the process of developing vision applications by using a Visual Programming Environment;

Utilize image processing algorithms that are robust, accurate, fast, and reliable;

Reduce software debugging time;

Develop applications which can easily have a graphical user interface such as a Windows™ user interface;

Support various processors and various frame grabbers such as Cognex processors;

Interface to various video sources including analog, digital, and the line scan cameras in addition to other image sources like a scanner;

Provide programmable tools for various application development environments such as Visual Basic™, Visual C++™, or Borland® Delphi™;

Use standard technology such as visual basic extension (VBX) technology;

Include a library of image processing and analysis techniques such as color, distortion correcting calibration, and template matching;

Provide calibration such as non-linear, 2-D, and 3-D calibration;

Include components or custom controls for multi-axis motion control;

Transparently accelerate speed by using on-board vision processing; and

Operate typically with a single monitor.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIGS. 12–22 are screen displays associated with a search tool custom control;

FIGS. 23–27 are screen displays associated with a blob tool custom control;

BEST MODES FOR CARRYING OUT THE INVENTION

Figure 1:
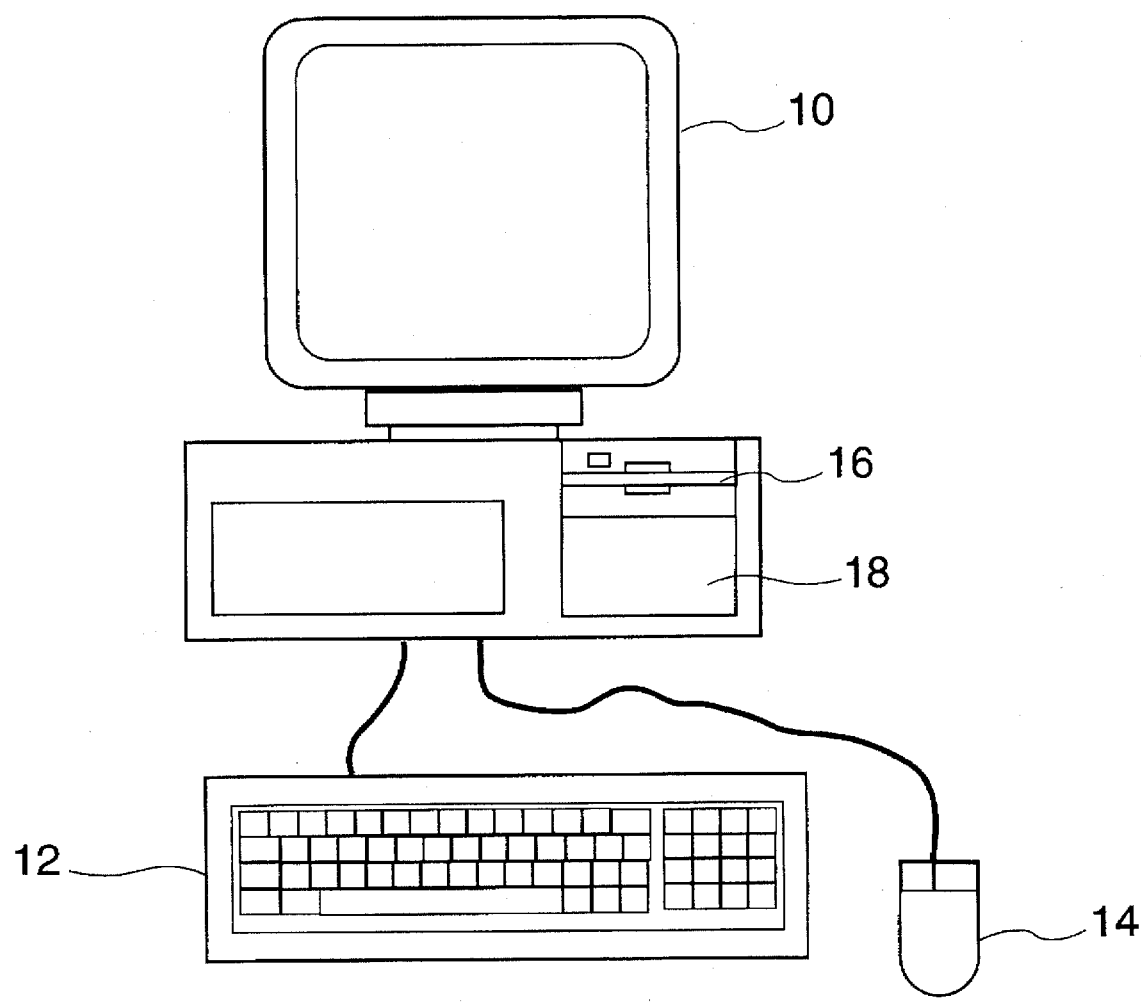
FIG. 1 is a schematic diagram illustrating a preferred hardware configuration on which the method of the present invention can be implemented.

Referring now to the drawings figures, there is illustrated in FIG. 1 a workstation on which the method and system of the present invention can be implemented. The hardware illustrated in FIG. 1 includes a monitor 10 such as a single SVGA display, a keyboard 12, a pointing device such a mouse 14, a magnetic storage device 16, and a chassis 18 including a CPU and random access memory. In a preferred embodiment, the chassis 18 is a Pentium-based IBM compatible PC or other PC having 8 megabytes of RAM and at least 12 megabytes of hard disk space.

The hardware configuration also includes the development environments of either Microsoft Visual Basic, Microsoft Visual C++, or Borland Delphi together with a Microsoft Windows user interface.

Figure 2:
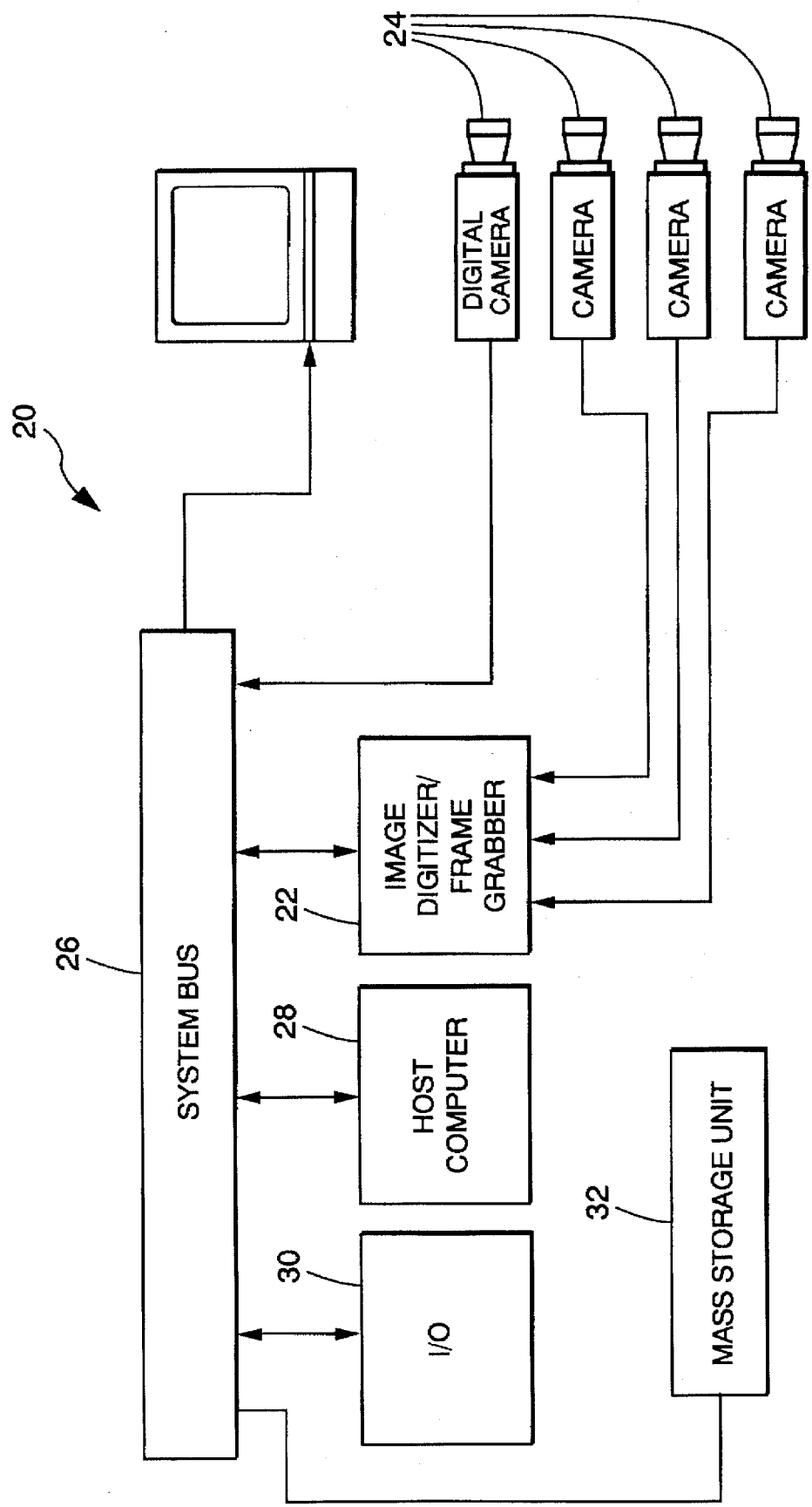
FIG. 2 is a schematic diagram illustrating a machine vision system which can be supported by the method and system of the present invention.

Referring now to FIG. 2, there is illustrated schematically a machine vision system generally indicated at 20 generally of the type which can be supported by the method and system of the present invention. The machine vision system 20 typically includes an image digitizer/frame grabber 22. The image digitizer/frame grabber 22 samples and digitizes the input images from one or more image sources such as cameras 24 and places each input image into a frame buffer having picture elements. Each of the picture elements may consist of an 8-bit number representing the brightness of that spot in the image.

The system 20 also includes a system bus 38 which receives information from the image digitizer/frame grabber 22 and passes the information on to the IBM compatible host computer.

The system 20 also includes input/output circuits 30 to allow the system 20 to communicate with external peripheral devices such as robots, programmable controllers, etc. having one or more stages.

One or more of the cameras 24 may be an image source such as an analog digital or line scan camera such as RS-170, CCIR, NTSC and PAL.

The system bus 26 may be either a PCI an EISA, ISA or VL system bus or any other standard bus.

The I/O circuits 30 may support a three axis stepper board (i.e. supports multiple axis control) or other motion boards.

The image digitizer/frame grabber 22 may be a conventional frame grabber board such as that manufactured by Matrox, Cognex, Data Translation or other frame grabbers. Alternatively, the image digitizer/frame grabber 22 may comprise a vision processor board such as made by Cognex.

The machine vision system 20 may be programmed at a mass storage unit 32 to include custom controls for image processing, image analysis, third party machine vision products, calibration, and interactive CAD/geometry as described in greater detail hereinbelow. Examples of image processing may include linear and nonlinear enhancement, morphology, color and image arithmetic. Also, image analysis may include search, edge, caliper, blob, template, color, 2-D and 3-D measurements.

Third party products may include digital I/O, various camera formats, motion, databases, SPC and others.

Calibration may include non-linear, 2-D, 3-D and color calibration.

Also, interactive CAD/geometry custom control may be provided for both 2-D and 3-D space.

Figure 3:
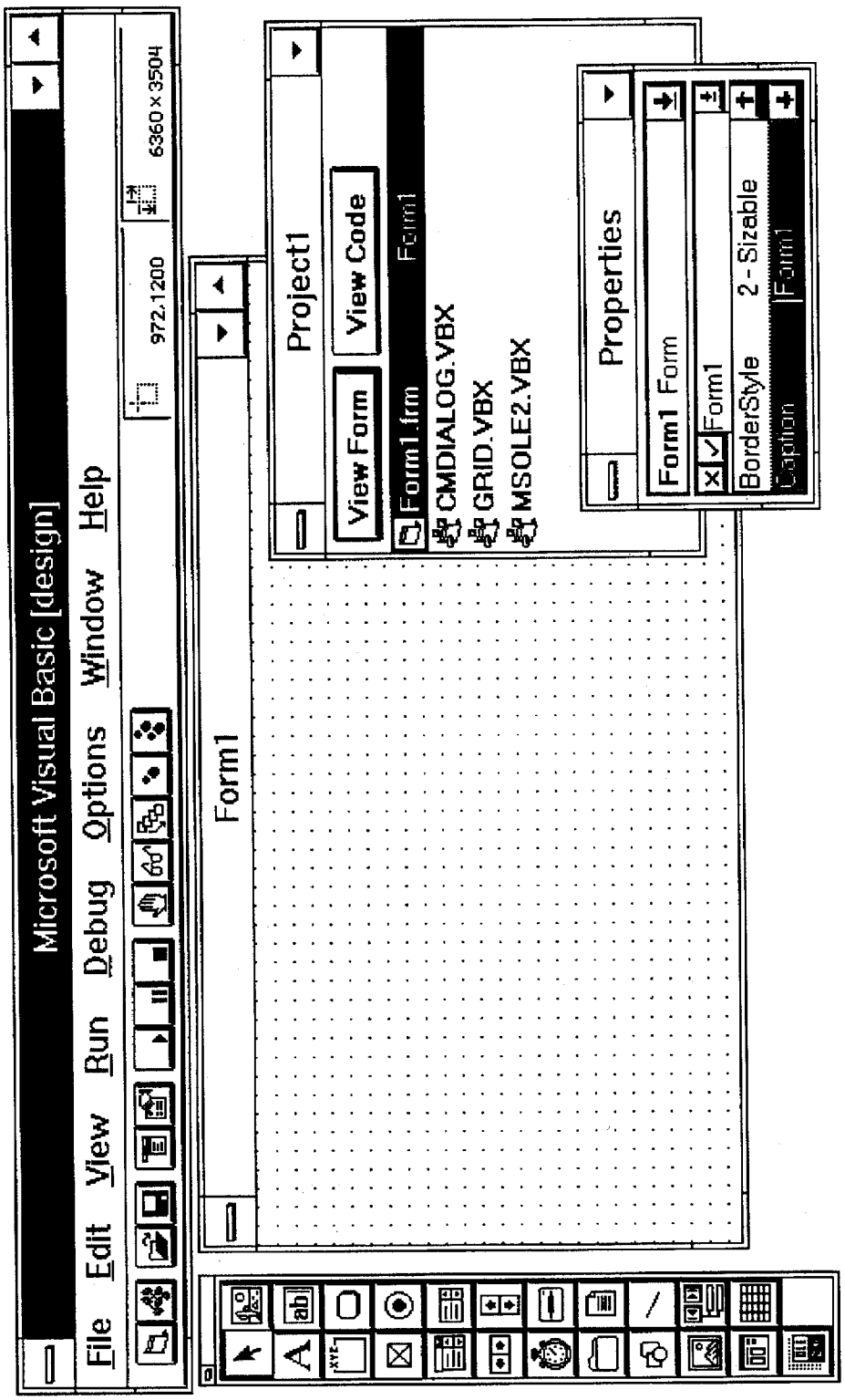
FIG. 3 is a screen display of a Visual Basic programming environment.

Referring now to FIG. 3, there is illustrated therein a Visual Basic programming environment screen. However, it is to be understood that the programming environment that can be utilized by the method and system of the present invention include other programming environments such as Microsoft Visual C++ or Borland Delphi as well as others.

Figure 4:
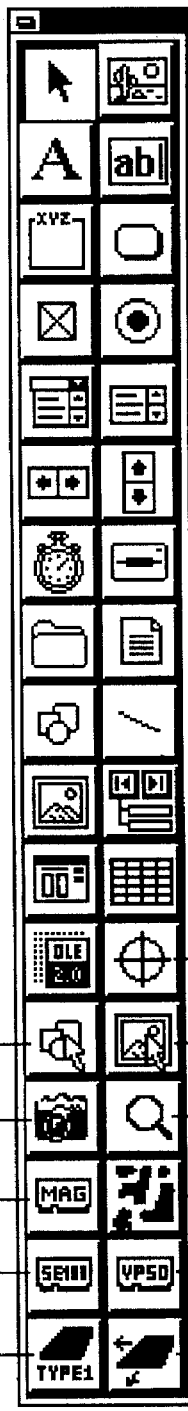
FIG. 4 is a portion of the Visual Basic programming environment after custom controls of the present invention have been added.

Referring now to FIG. 4, there are illustrated icons of a Visual Basic toolbox which appear after various custom controls, which will be described in greater detail hereinbelow, are added thereto.

Each custom control is generally described as follows:

An editable shape custom control allows a user to define an image processing region by interactively editing a rectangular ellipsoidal or toroidal (donut) shape.

An editable image custom control works like the visual basic picture box control with enhancements that give the user added image viewing and processing options.

A camera custom control allows a user to capture and store live images from a video camera.

A search tool custom control looks for a specific feature in an image that matches a model that a user trained it to recognize; reports the characteristic of the feature found.

A Magic custom control allow the camera control to capture images when the user has a Magic vision board installed. (This tool is invisible at run time.)

A blob tool custom control finds groups of connected pixels or "blobs" in an image; reports on the characteristics of each blob it found.

An SE 100 custom control allows the camera control to capture images when the user has an SE 100 vision board installed. (This tool is invisible at run time.)

A VP 50 custom control allows the camera control to capture images—and optionally speeds up images searches—when the user has a VP vision board installed. (This tool is invisible at run time.)

A Type I stage custom control allows the stage control to work with a specific manufacturer's stage known as "Type I" (This tool is invisible at run time.)

A Stage custom control allows a user to control a multi-axis stage through a graphical user interface. The developer can include stage control properties and methods in higher level code.

While not shown, a tool board custom control allows a user to navigate through windows and menus in the application by simply clicking buttons on a tool bar.

Also while not shown, a Type II stage custom control allows the stage control to work with a specific manufacturer's stage known as "Type II" (This tool is also invisible at run time.)

Finally, while also not shown, a Type III stage custom control allows the stage control to work with a specific manufacturer's stage known as "Type III" (This tool is furthermore invisible at run time.)

In general, it is possible to very quickly and easily build machine vision applications or programs using the custom controls illustrated in FIG. 4 in the Microsoft Visual Basic programming system. In general, one creates the user interface or a vision application by placing Visual Basic and the custom controls on a form. Next, one sets the properties for both the Visual Basic standard controls and the custom controls. Finally, one writes code to link together the different parts of the application to obtain the application program.

What follows now is a detailed description of the various custom controls of FIG. 4 together with example code. Also described for each of the custom controls are various properties for use in forming the application program.

Figure 5:
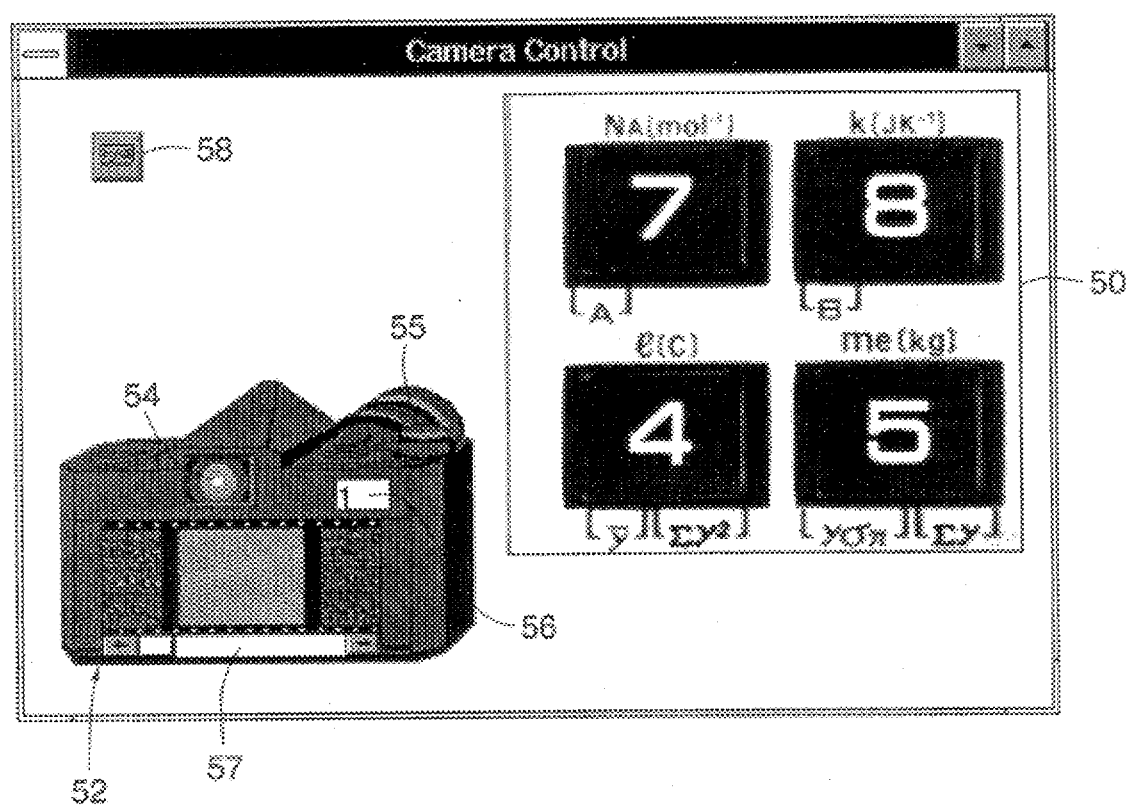
FIG. 5 is a screen display associated with a camera custom control.

Camera VBX Control
  Description
    Referring now to FIG. 5, the camera custom control allows color or black and white live image views from a video camera and allows static images to be grabbed from the video camera as indicated at area 50 for subsequent processing and analysis. The camera may be envisaged as a real-world 35 mm camera, generally indicated at 52, with a viewfinder 54 to look through in order to compose the image, a button 55 to take a picture, various knobs and switches which control how the image is taken, an image counter 56, and film 57 inside the camera with a number of image frames which can be individually retrieved.

The asynchronous image capture facility allows images to be taken while other work is being performed, thus increasing overall throughput. This is not available on all types of cameras.

File Name
  VISION. VBX
Object Type
  Camera
Remarks
  Before live image views can be displayed and before images can be grabbed, the Camera control must be linked to a camera from a particular vision board. To link the Camera control to the camera from a particular vision board, set the Camera property of the Camera control equal to the Camera property of a vision board control, such as the Matrox Magic control as represented by an icon 58.

To display a live image, click on the viewfinder on the Camera control. To grab an image, click on the shutter release button on the Camera control.

To display a grabbed image, the Editable Image control can be used. Set the RasterImage property of the Editable Image equal to the Image property of the Camera control.

Another way to display live image views and grab images is to use the context sensitive popup menu. To display the popup menu, click the right mouse button over the Camera control.

Camera Control Example Code
  Place a camera control, Picture control and a vision board control (e.g. Matrox control) onto a form, and then paste the following code into the declarations section of the form.

```
Sub Form_Load( )
    Camera1.Camera=Magic1.Camera
    Camera1.hDisplayWnd=Picture1.hWnd
End Sub
```

Camera Property, Camera Control
  Description
    Sets or returns the particular type of Camera hardware. This property is not available at design time.
  Visual Basic
    [form.]Camera. Camera[=camera&]
  Visual C++
    pCamera→GenNumProperty ("Camera")
    pCamera→SetNumProperty ("Camera", camera)
  Remarks
    This property must be set to the Camera property of a vision board Control (such as the Matrox Magic Control), or from another source which provides a compatible property.
  Data Type
    Long
Camera Property, Magic Control
  Description
    Returns a value which can be used for the Camera property of the Camera Control. This value is specified by the CameraIndex property. This property is read-only at run time, not available at design time.
  Visual Basic
    [form.]Magic.Camera
  Visual C++
    pMagic→GetNumProperty("Camera")
  Remarks
    Sets the Camera property of the Camera Control equal to this property at run time.
  Data Type Long

RasterImage Property, Editable Image Control

Description

Sets or returns the image data in the editable image. This property is not available at design time.

Visual Basic

[form.]EditableImage.RasterImage[=image&]

Visual C++ pEditableImage→GetNumProperty("Rasterimage");
pEditableImage→SetNumProperty("Rasterimage", image);

Remarks

This property may be set to the Image property of a Camera Control, or from another source which provides a compatible property.

Data Type

Long

Image Property, Camera Control

Description

Returns the image of the currently selected film frame. This property is read-only at run time, not available at design time.

Visual Basic

[form.]Camera.Image[=image&]

Visual C++ pCamera→GetNumProperty ("Image")

Remarks

This property may be used to set the Raster-Image property of the Editable image control, or a compatible image property of any other control.

Data Type

Long

SE100 Control

Description

Figure 6:
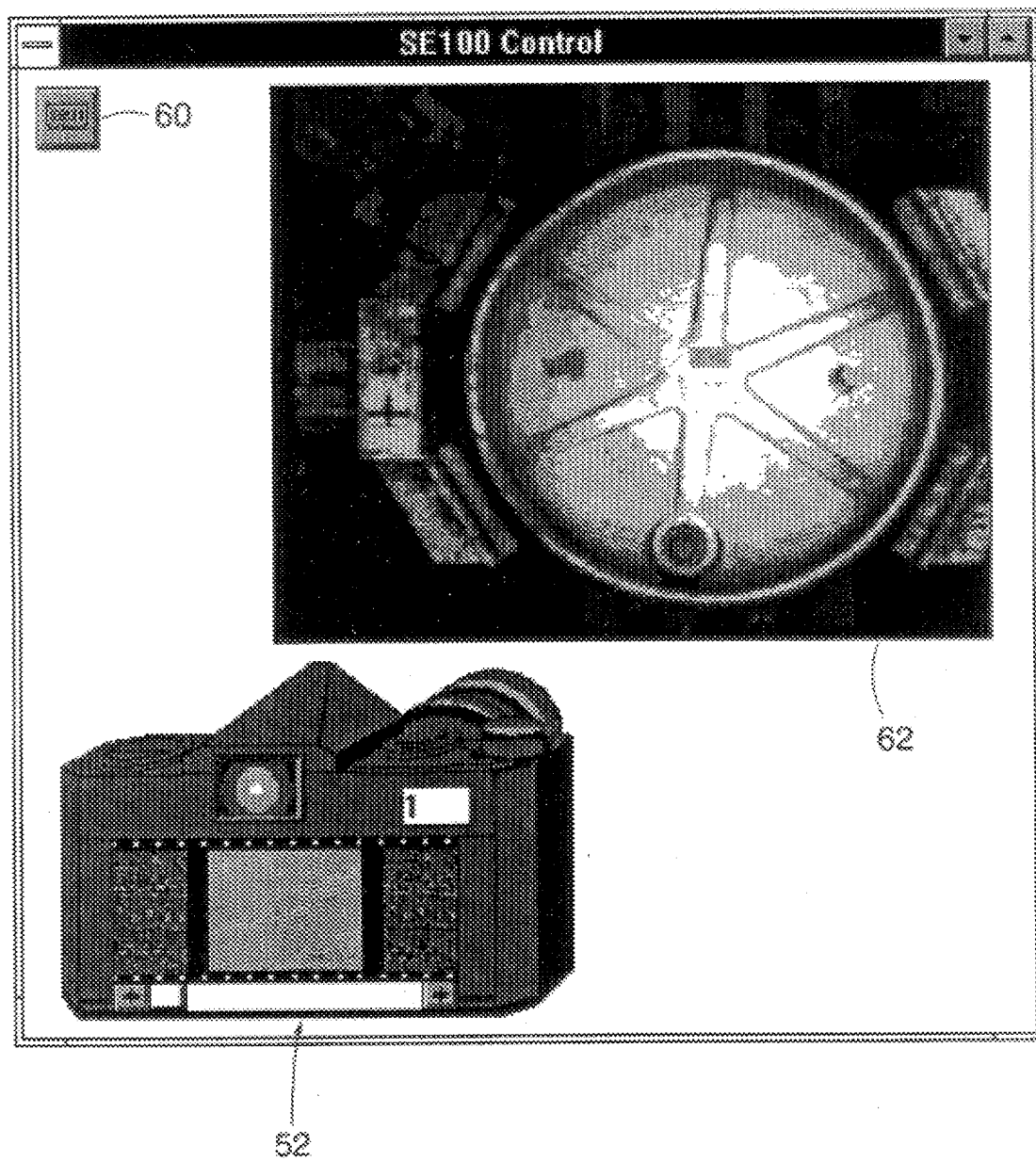
FIG. 6 is a screen display associated with an SE100 custom control.

Referring now to FIG. 6, the SE100 Control is a run-time invisible control which provide an implementation of the Camera property for use by the Camera Control represented by camera control icon 52. An editable image or picture box is shown at area 62 in FIG. 6.

File Name

VISION.VBX

Object Type

SE100

Remarks

To use the SE100 Control, set the Camera property of the Camera Control equal to the Camera property of the SE100 Control at run time.

SE100 Control Example

Place a Camera Control, a Picture Box Control and a SE100 Control (i.e. icon 60) onto a Form, and then paste the following code into the declarations section of the form:

```
Sub Form_Load( )
    Camera1.hDisplayWnd=Picture1.hWnd
    Camera1.Camera=SE1001.Camera
End Sub
```

Camera Property, SE100 Control

Description

Returns a value which can be used for the Camera property of the Camera Control. This property is read-only at run time, not available at design time.

Visual Basic

[form.]SE100.Camera

Visual C++ pSE100→GetNumProperty("Camera")

Remarks

Gets the Camera property of the Camera Control equal to this property at run time.

Data Type

Long

Magic Control

Description

Figure 7:
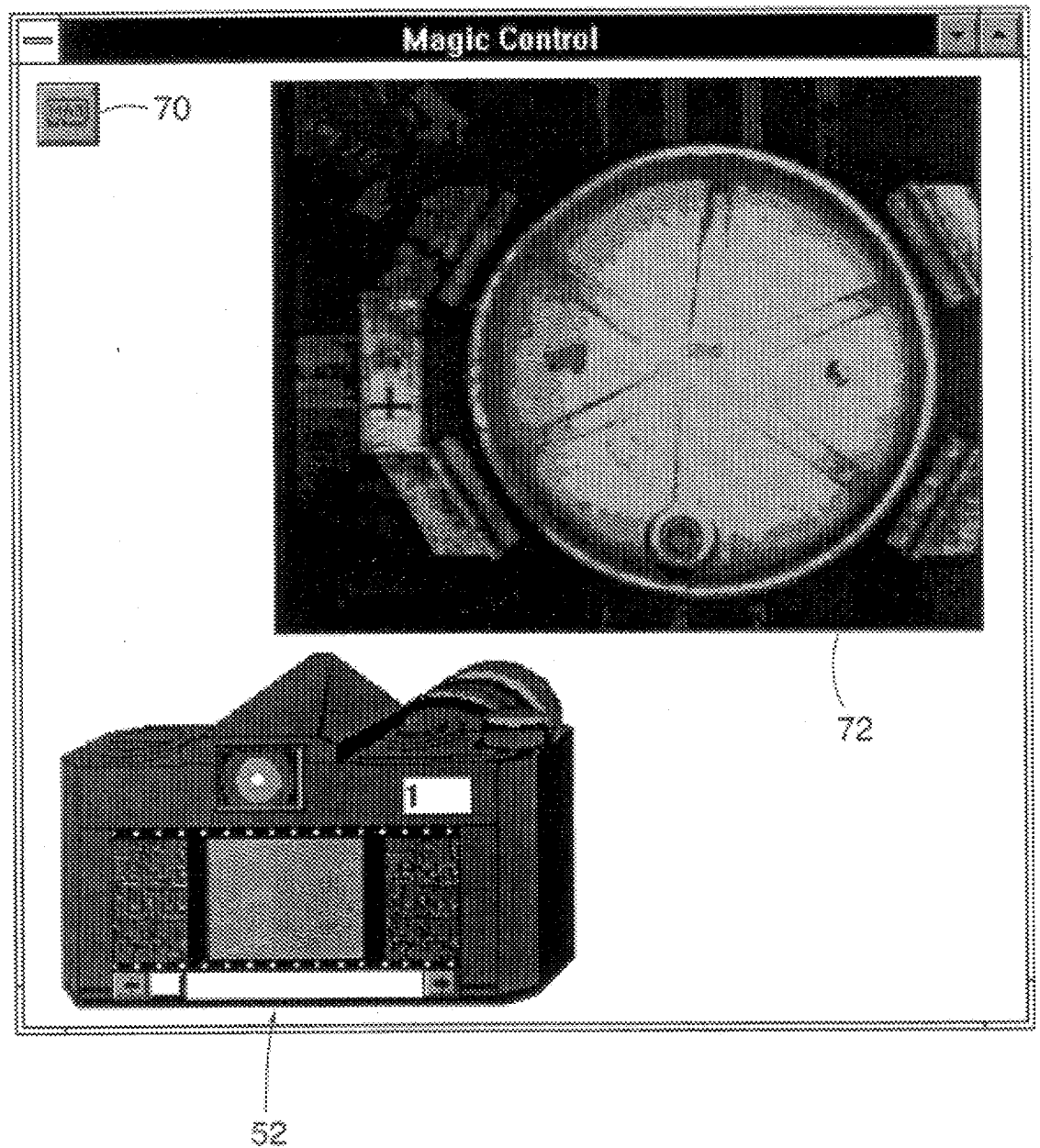
FIG. 7 is a screen display associated with a Magic custom control.

Referring now to FIG. 7, the Matrox Magic Control is a run-time invisible control which provide an implementation of the Camera property for use by the Camera Control represented by the camera control icon 52. An editable image or picture box is shown at area 72 in FIG. 7.

File Name

VISION.VBX

Object Type

Magic

Remarks

To use the Magic Control, set the Camera property of the Camera Control equal to the Camera property of the Magic Control at run time.

Magic Control Example

Place a Camera Control, a Picture Box Control and a Magic Control (i.e. icon 70) onto a Form, and then paste the following code into the declarations section of the form:

```
Sub Form_Load( )
    Camera1.hDisplayWnd=Picture1.hWnd
    Camera1.Camera=Magic1.Camera
End Sub
```

VP50 Control

Description

Figure 8:
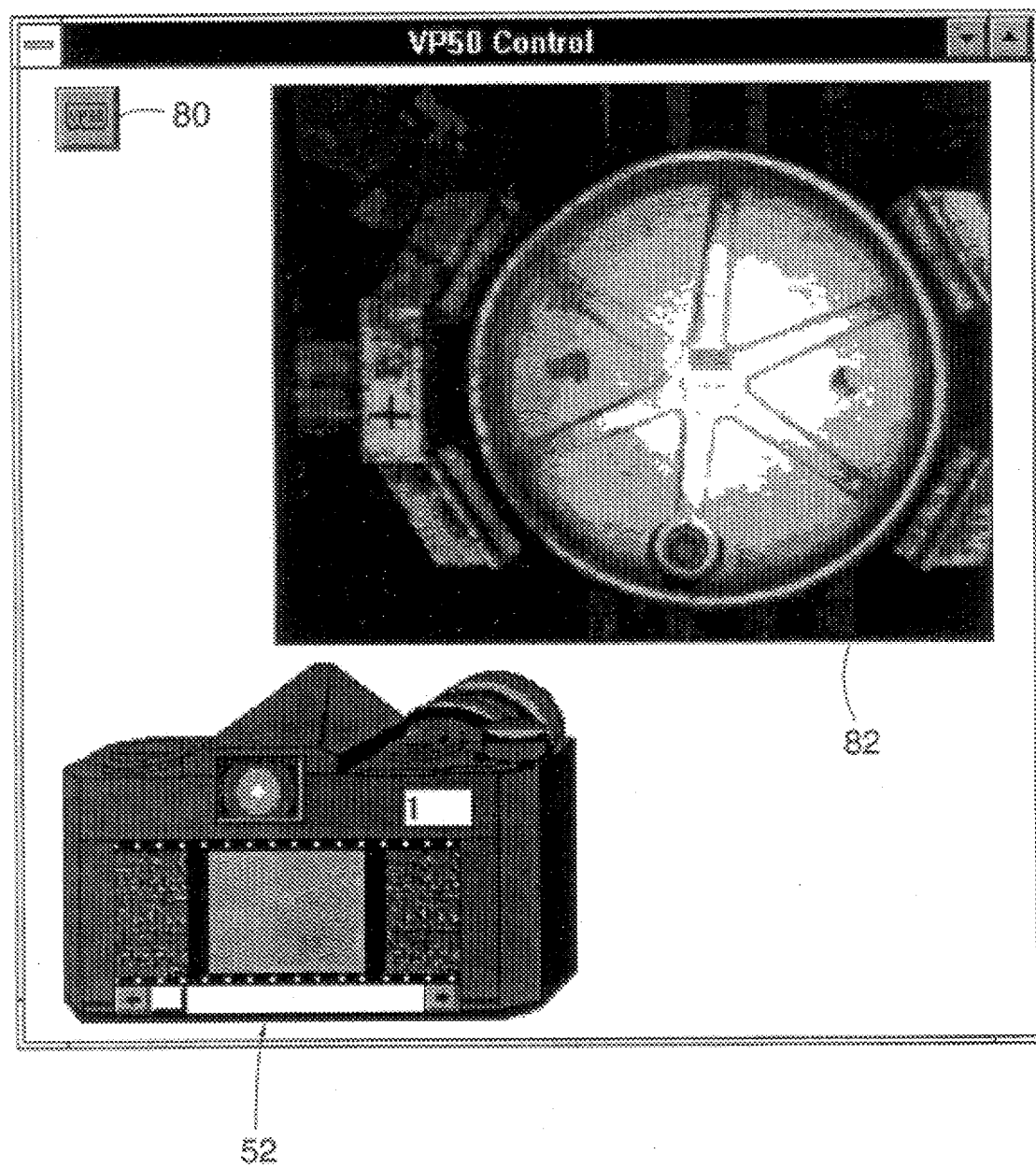
FIG. 8 is a screen display associated with a VP50 custom control.

Referring now to FIG. 8, the VP50 Control is a run-time invisible control which provide an implementation of the Camera property for use by the Camera Control, and the Model property for use by the Search Tool Control represented by the camera control icon 52. An editable image or picture box is shown at area 82 in FIG. 8.

File Name

VISION.VBX

Object Type

VP50

Remarks

To use the VP50 Control, set the Camera property of the Camera Control equal to the Camera property of the VP50 Control at run time, and set the Model property of the search Tool Control equal to the Model property of the VP50 Control at run time.

VP50 CONTROL EXAMPLE

Place a Camera Control, a Picture Box Control, a Search Tool Control, an EditableImage Control and a VP50 Control (i.e. icon 80) onto a Form, and then past the following code into the declarations section of the form.

```
Sub Form_Load( )
    Camera1.hDisplayWnd=Picture1.hWnd
    Camera1.Camera=VP501.Camera
    SearchTool1.Model=VP501.Model
    SearchTool1.hTrainingImage=EditableImage1.hCtl
    SearchTool1.hSearchingImage=
        EditableImage1.hCtl
End Sub
Sub Camera1_Grab( )
    EditableImage1.RasterImage=Camera1.Image
End Sub
```

Camera Property, VP50 Control

Description

Returns a value which can be used for the Camera property of the Camera Control. This property is read-only at run time, not available at design time.

Figure 9:
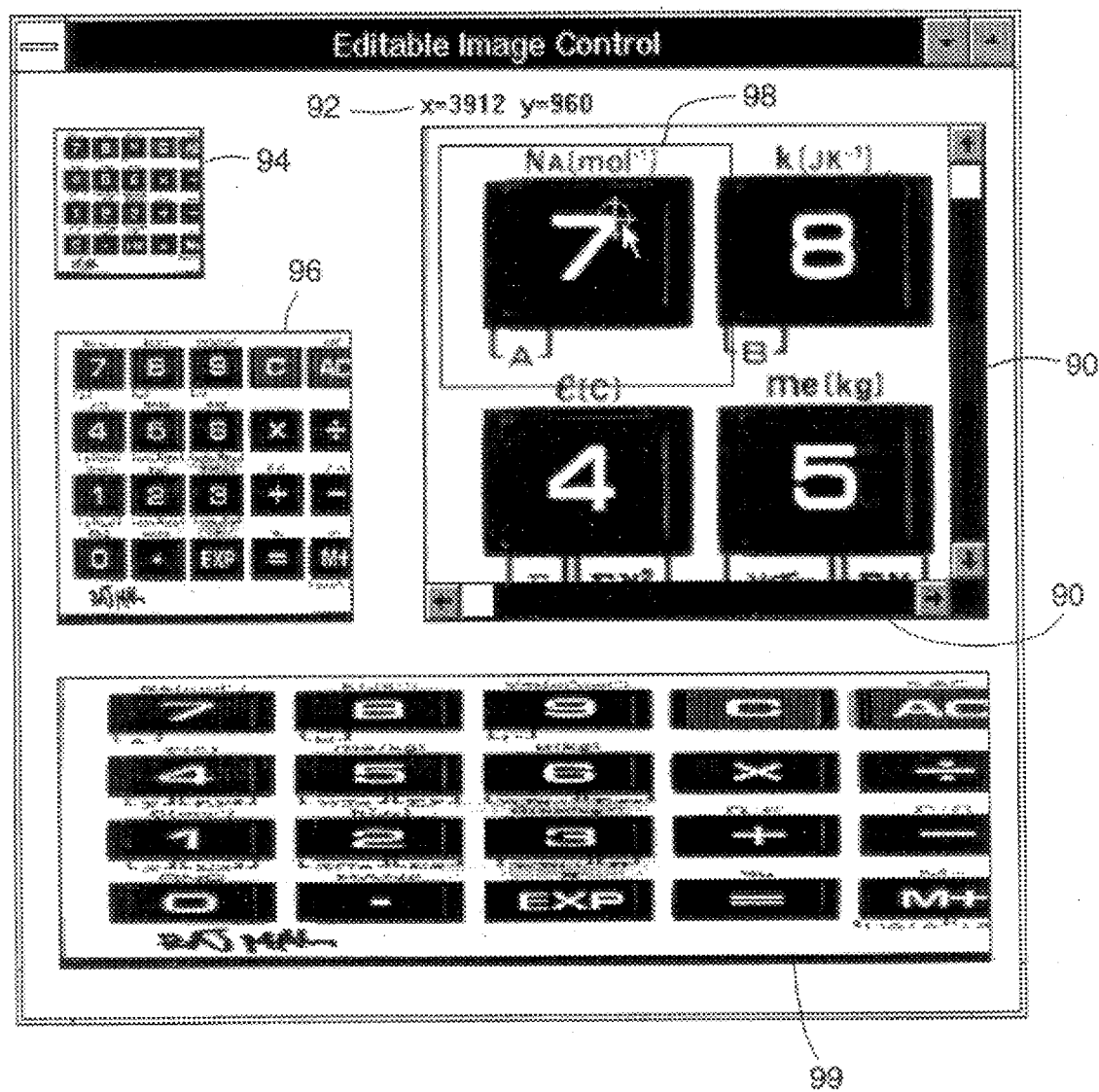
FIGS. 9–11 are screen displays associated with a editable image custom control.
Figure 10:
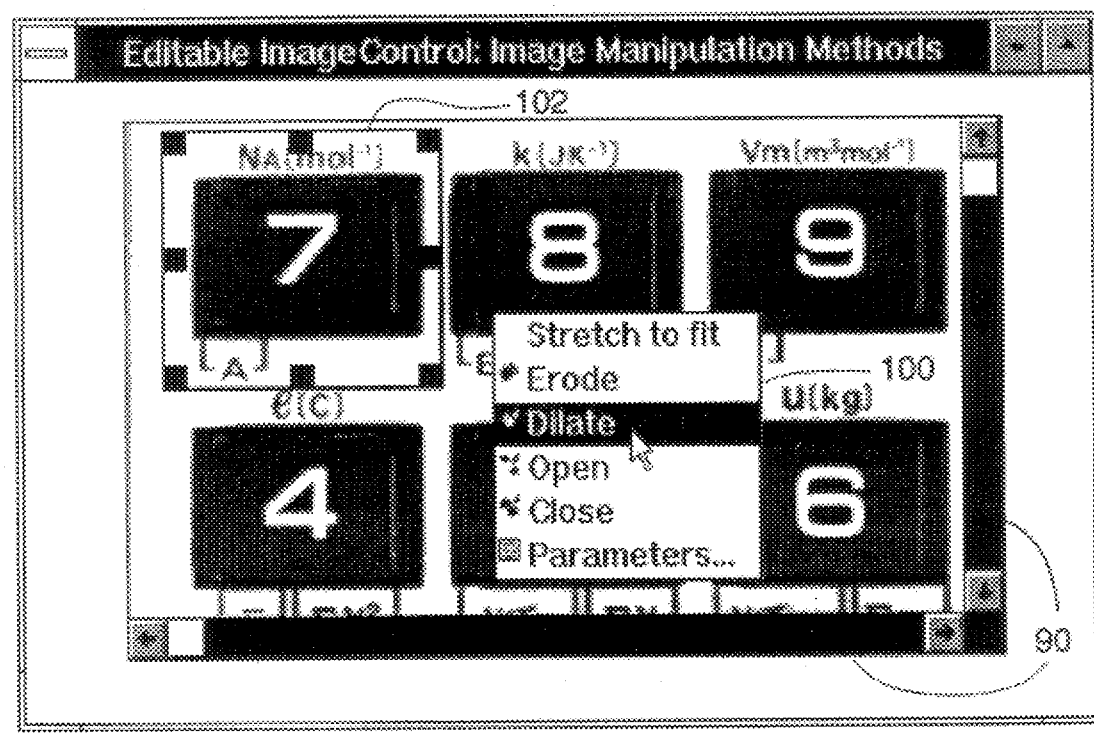
Figure 11:
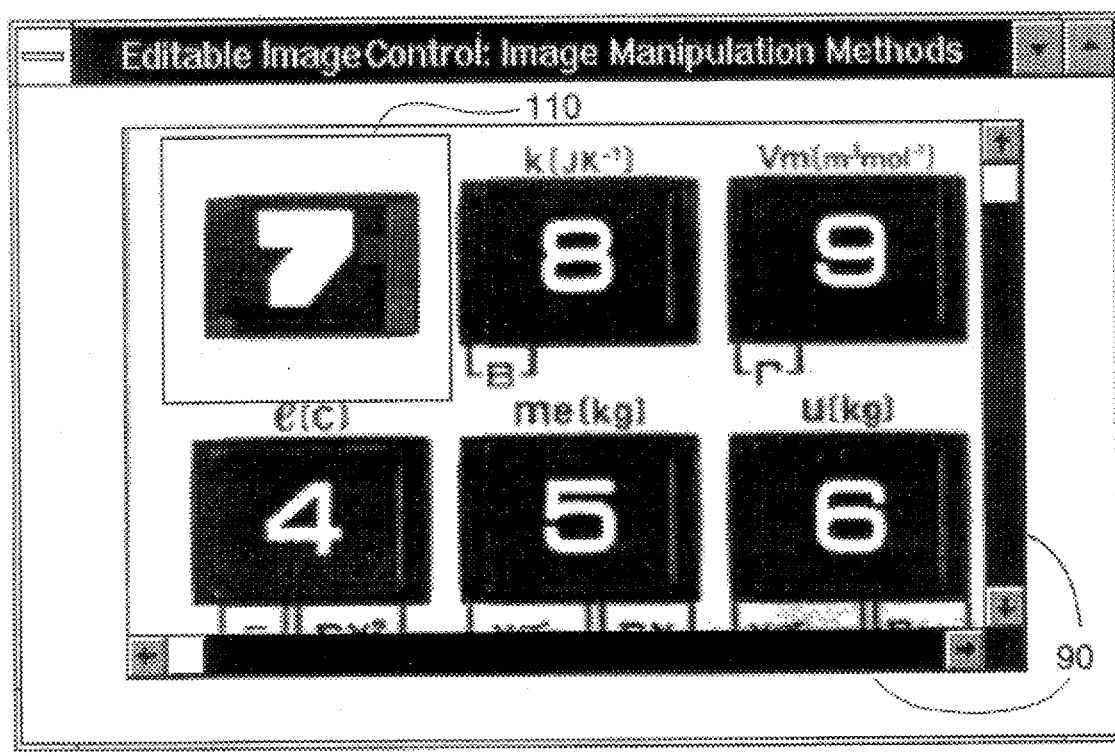
Figure 12:
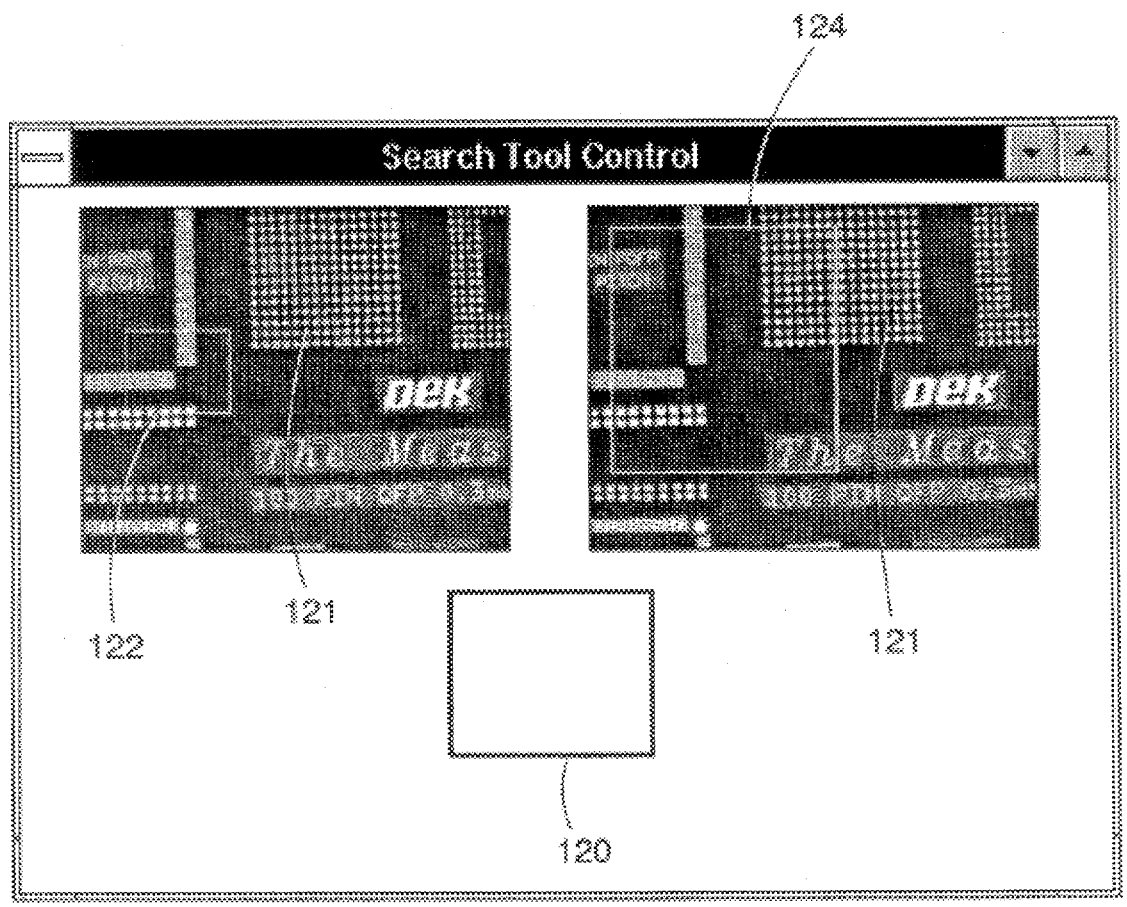
Figure 13:
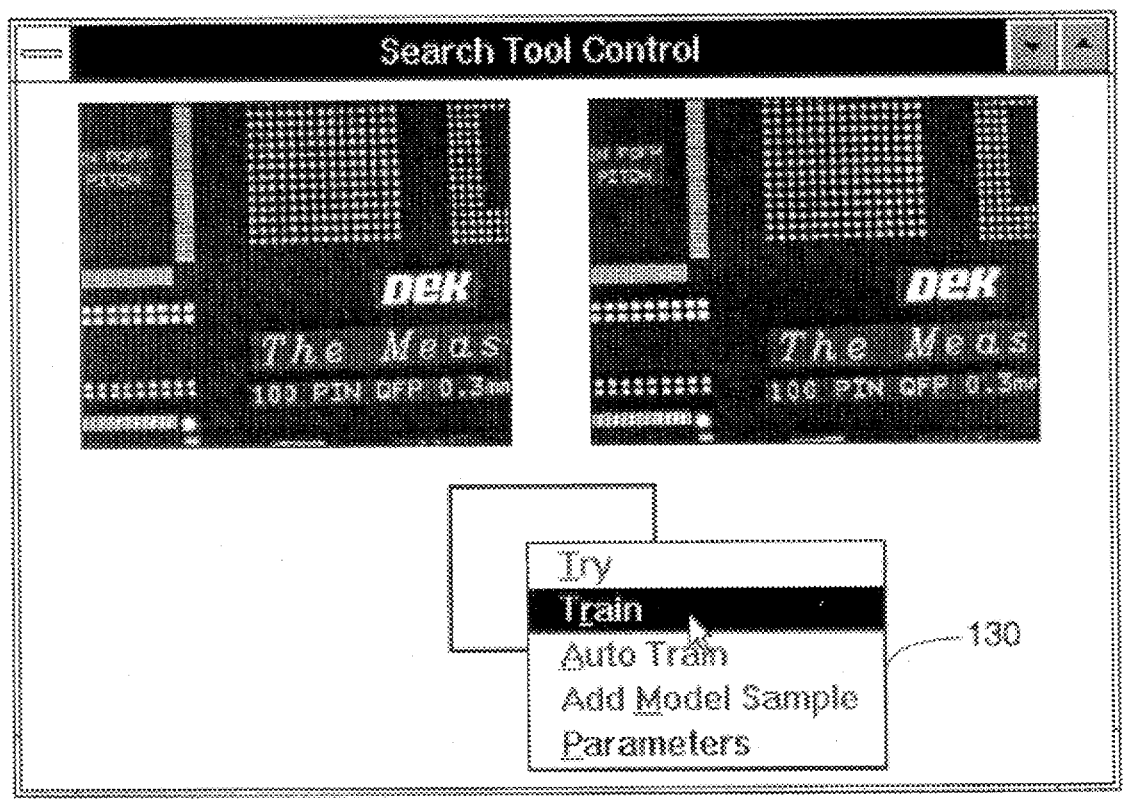

Visual Basic
 (form.)VP50.Camera
Visual C++
 pVP50→GetNumProperty ("Camera")
Remarks
 Set the Camera property of the Camera Control equal to this property at run time.
 Data Type
  Long
Model Property, Search Tool Control
 Description
 Sets or returns the model data in the search tool. This property is not available at design time.
 Visual Basic
  [form.]SearchTool. Model[=model&]
 Visual C++
  pSearchTool→GetNumProperty("Model")
  pSearch Tool→SetNum Property ("Model", model)
 Remarks
 By default, the model data is stored in the host memory, and the Search Tool methods run on the host CPU. For extra speed, this property may be set to the Model property of a vision board Control (such as the Matrox Control), or from another source which provides a compatible property.
 Data Type
  Long
Model Property, VP50 Control
 Description
 Returns a value which can be used for the Model property of the Search Tool Control. This property is read-only at run time, not available at design time.
 Visual Basic
  [form.]VP50.Model
 Visual C++
  pVP50→GetNumProperty ("Model")
 Remarks
 Set the Model property of the Search Tool Control equal to this property at run time.
 Data Type
  Long
Editable Image Control
 Description
 Referring now to FIGS. 9–11, the Editable Image control emulates the standard Visual Basic Picture control. In addition, at run time one can zoom and scroll around the image via scroll bars 90, view the coordinates at area 92 and the value of the pixel underneath the mouse cursor, perform image processing operations on the image, and attach a Region Of Interest at 98 to the image. A stretched or distorted image appears at area 99. The image may originate from the usual Picture or Image properties, or from the additional RasterImage property, which can be set to the Raster-Image property from a Camera control or another source. The RasterImage property can be passed to Machine Vision controls.
 File Name
  VISION.VBX
 Object Type
  EditableImage
 Remarks
 To scroll around an image, use the scrollbars 90 provided. The scrollbars 90 appear automatically if they are necessary. To zoom into an image, click the left mouse button over the image. To zoom out as illustrated at scaled images 94 and 96, click the middle mouse button. Zooming can also be performed using the context sensitive popup menu 100 in FIG. 10. Click over the image with the right mouse button to display the menu 100.
 The coordinates and value of the pixel currently underneath the mouse cursor are displayed at the top area 92 of the image. These are only visible if the CoordinatesVisible property is set to true. The cursor keys can be used to move the mouse in single pixel increments.
 Image processing operations may be accessed at run time from the popup menu 100. To restrict the image processing to a region of interest 98, place an EditableShape control on the image control and set the hRegionOfInterestShape property to the hCtl property of the editable shape. The selected region is indicated at 102 in FIG. 10. The result of performing dilation on a selected image region is indicated at 130 in FIG. 11.
 To link the Editable Image control to an image grabbed with a Camera control, set the RasterImage property of the Editable Image control equal to the Image property of the Camera control.
Editable Image Control Example
 Place an EditableImage control onto a form, load an image using the Picture property, place an EditableShape on the editable image, and then paste the following code into the declarations section of the form:

```
Sub Form_Load( )
   EditableImage1.hRegionOfInterestShape =
EditableShape1.hCtl
   End Sub
```

CoordinatesVisible Property, Editable Image Control
 Description
 Sets or returns whether the cursor coordinates are visible.
 Visual Basic
  [form.]EditableImage. CoordinatesVisible[= {True|False}]
 Visual C++
  pEditableImage→GetNumProperty ("CoordinatesVisible")
  pEditableimage→SetNumProperty ("CoordinatesVisible", {True|False})
 Remarks
 The cursor coordinates are displayed in physical world units, as defined by the Calibration control referenced in the hCalibration property.
 Date Type
  Integer(Boolean)
hRegionOfInterestShape Property, Editable Image Control
 Description
 Sets or returns the region of interest of the editable image. This property is not available at design time.
 Visual Basic
  [form.]EditableImage.hRegionOfInterestShape [=shape&]
 Visual C++
  pEditableimage→GetNumProperty ("hRegionOfInterestShape")
  pEditableimage→SetNumProperty ("hRegionOfInterestShape", shape)
 Remarks
 This property may be set to the hCtl property of an Editable Shape Control. Once set, all operations on the image will be restricted to the area enclosed by the shape. One can clear the region of interest by setting this property to Null.

Date Type
  Long
hCtl Property, Point, Editable Shape, Editable Image, Tool Controls
  Description
    Returns the control handle.
  Visual Basic
    [form.]Control.hCtl
  Visual C++
    pControl→GetNumProperty ("hCtl")
  Remarks
    This property is used to link one control to another. For example, setting the hRegionOfInterestShape property of an Editable Image control to the hCtl property of an Editable Shape control defines the region of interest for the editable image to be a particular shape.
  Data Type
    Long Search Tool Control
  Description
    Referring now to FIGS. 12–22, the Search Tool control is a vision tool which can be trained to locate a specific feature, or model (i.e. 122), within an editable image 121. The trained image appears at area 120. If the model 122 is located within the image a result is produced, which details the location, quality, angle, contrast etc. of the located model. A search region is defined by area 124.

Figure 14:
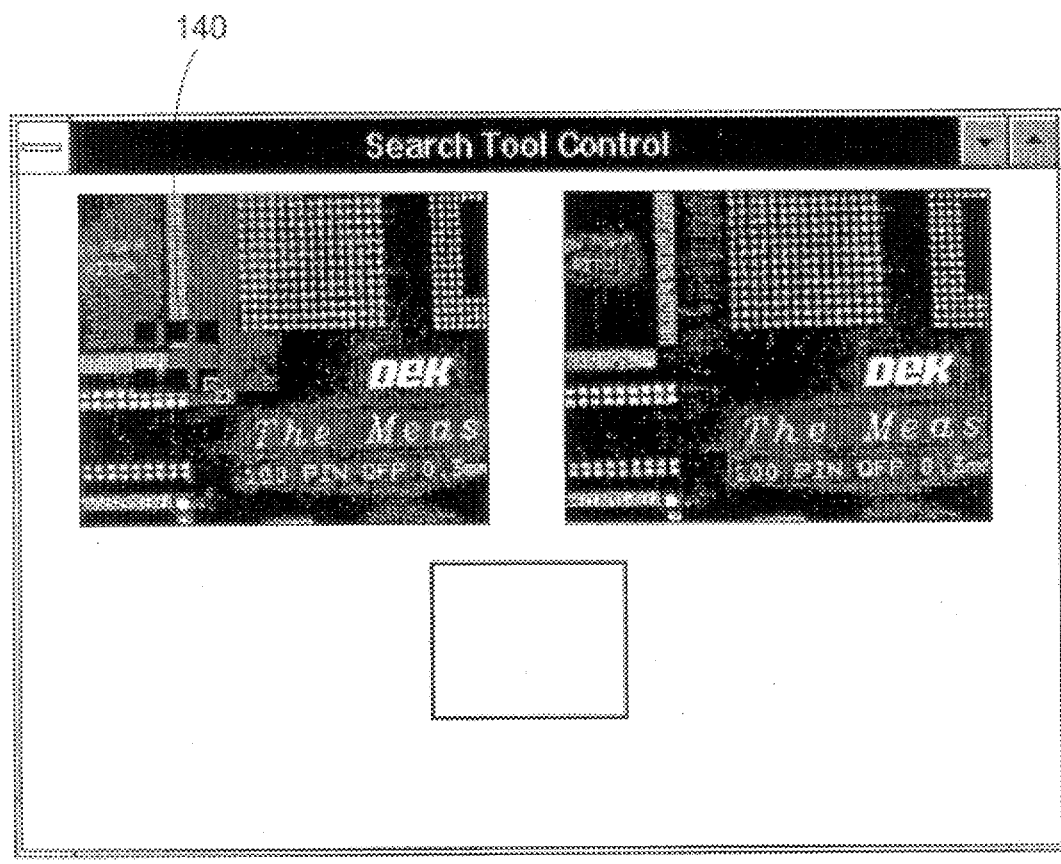
Figure 15:
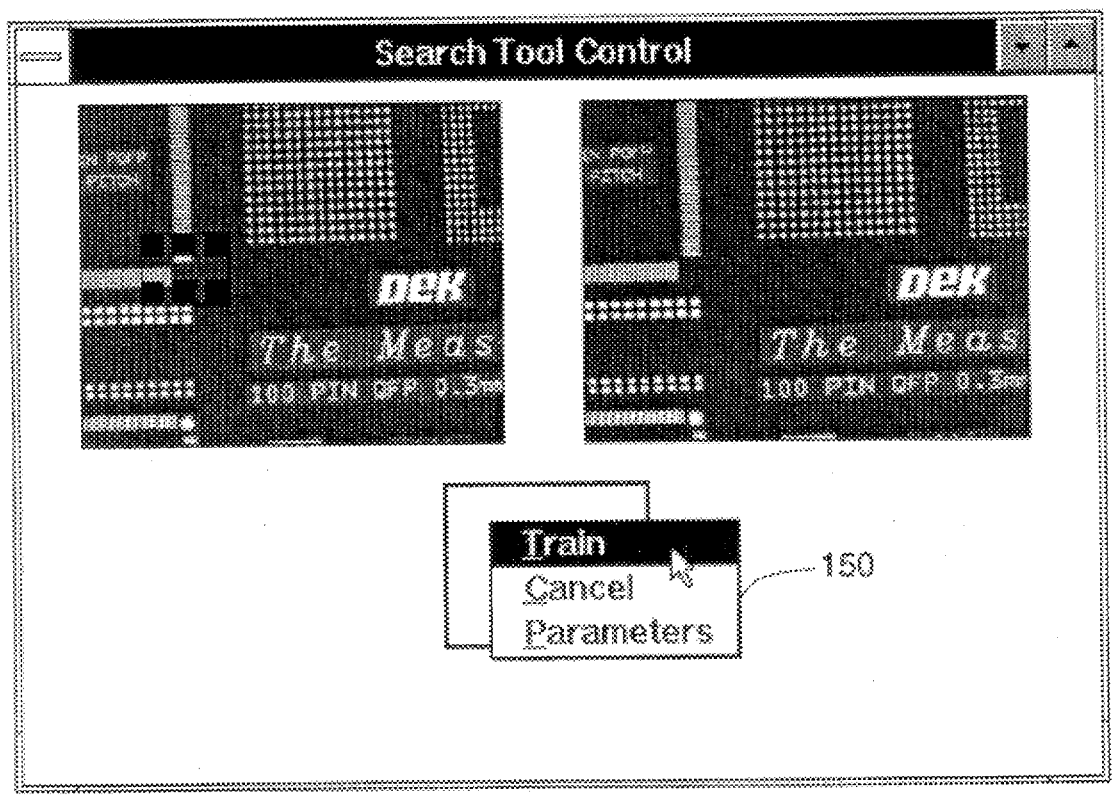
Figure 16:
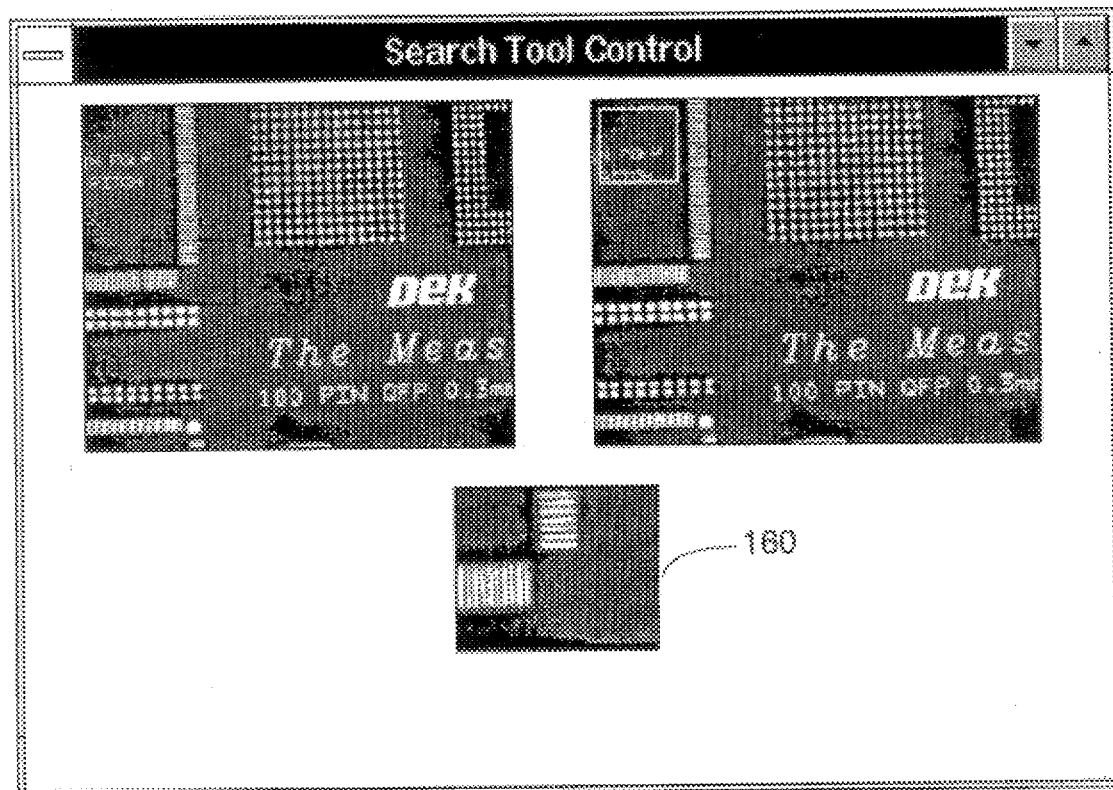
Figure 17:
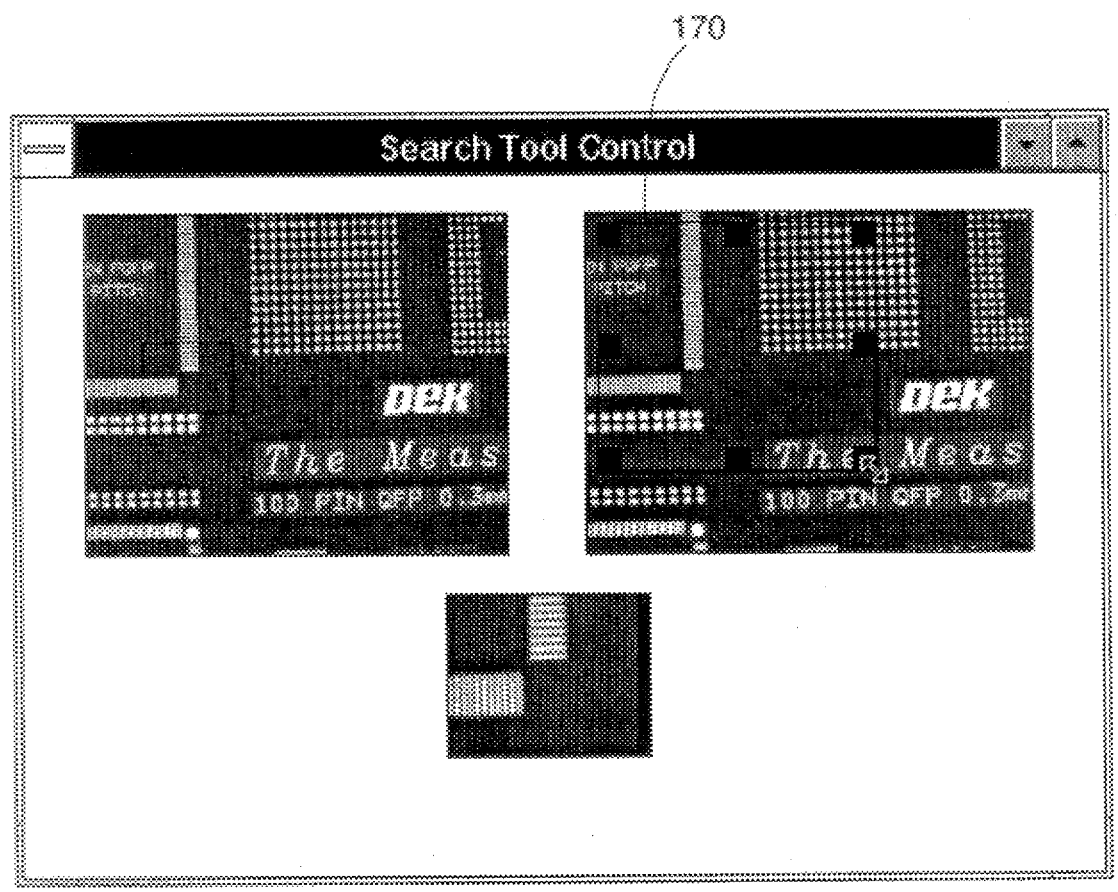

Various properties and methods allow the training and search process to be controlled. These properties and methods can be accessed at design time and also at run time through a context sensitive popup menu 130 of FIG. 13. This menu 130 can be accessed by clicking with the right mouse button on the Search Tool control. FIG. 14 illustrates the interactive edit of the shape/location of the image region to be trained (i.e. the model) at area 140. FIG. 15 illustrates the popup menu 150 which lets the user train the select image as a model. FIG. 17 illustrates at area 170 the interactive edit of the shape/location of the search region.

Figure 18:
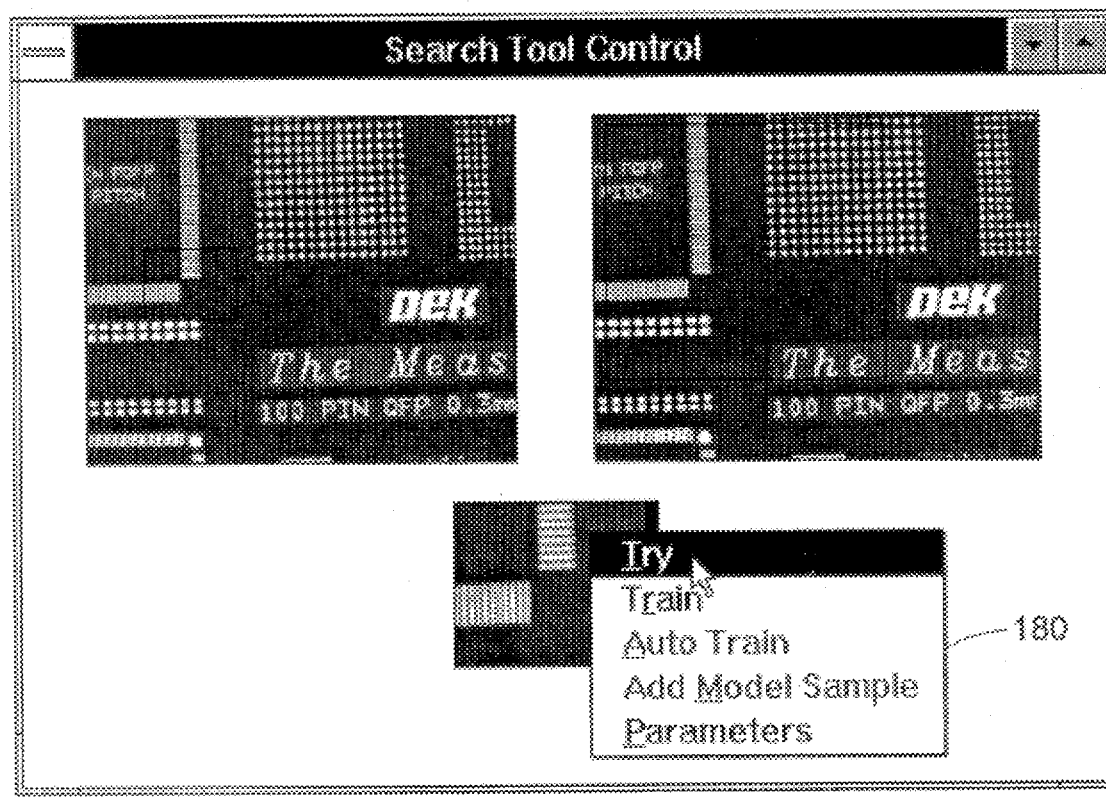
Figure 19:
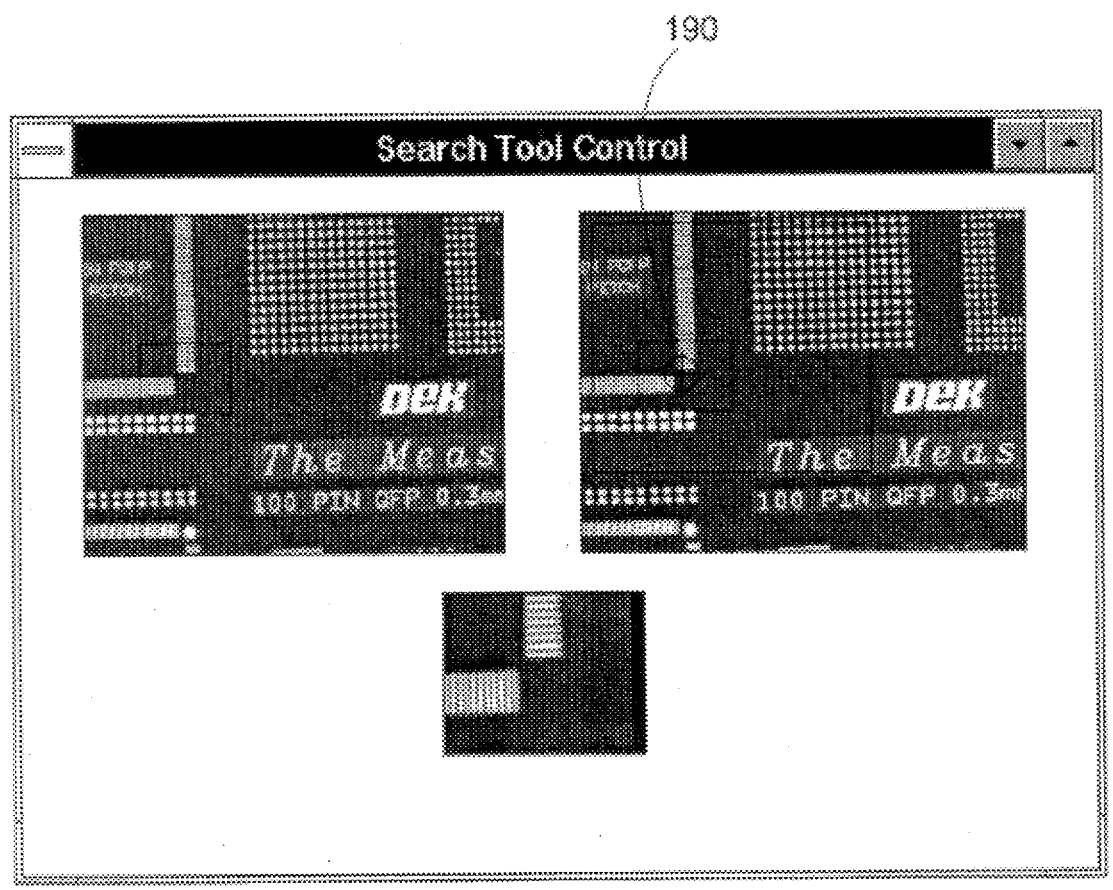

File Name
    VISION.VBX
  Object Type
    Search Tool
  Remarks
    The Search Tool has both a graphical user interface and a code interface. To use the Search Tool, do the following:
    1) The control must first be linked to a Model, Images, Editable Shapes and a Point by setting the hTrainingImage, hSearchingImage and hResultPoint properties. The training and searching images should have their hRegionOfInterestShape property set.
    2) Start the training process by either selecting Train from the popup menu or by making the training image region of interest shape visible. Position the editable shape over the desired model in the training image.
    3) Train the model, by either selecting Train for a second time from the popup menu (i.e. FIG. 13) or by calling the Train. The trained image or model appears in a search tool box 160 in FIG. 16.
    4) With the searching image region of interest shape visible, position the editable shape to define the searching region.
    5) As illustrated in FIG. 18, search for the model by either selecting Try from the popup menu 180, or by calling the Search method.
    6) As illustrated in FIG. 19, area 190 indicates when and where the image model was found in the search region.

The results of the search may now be accessed through the relevant properties.

Figure 20:
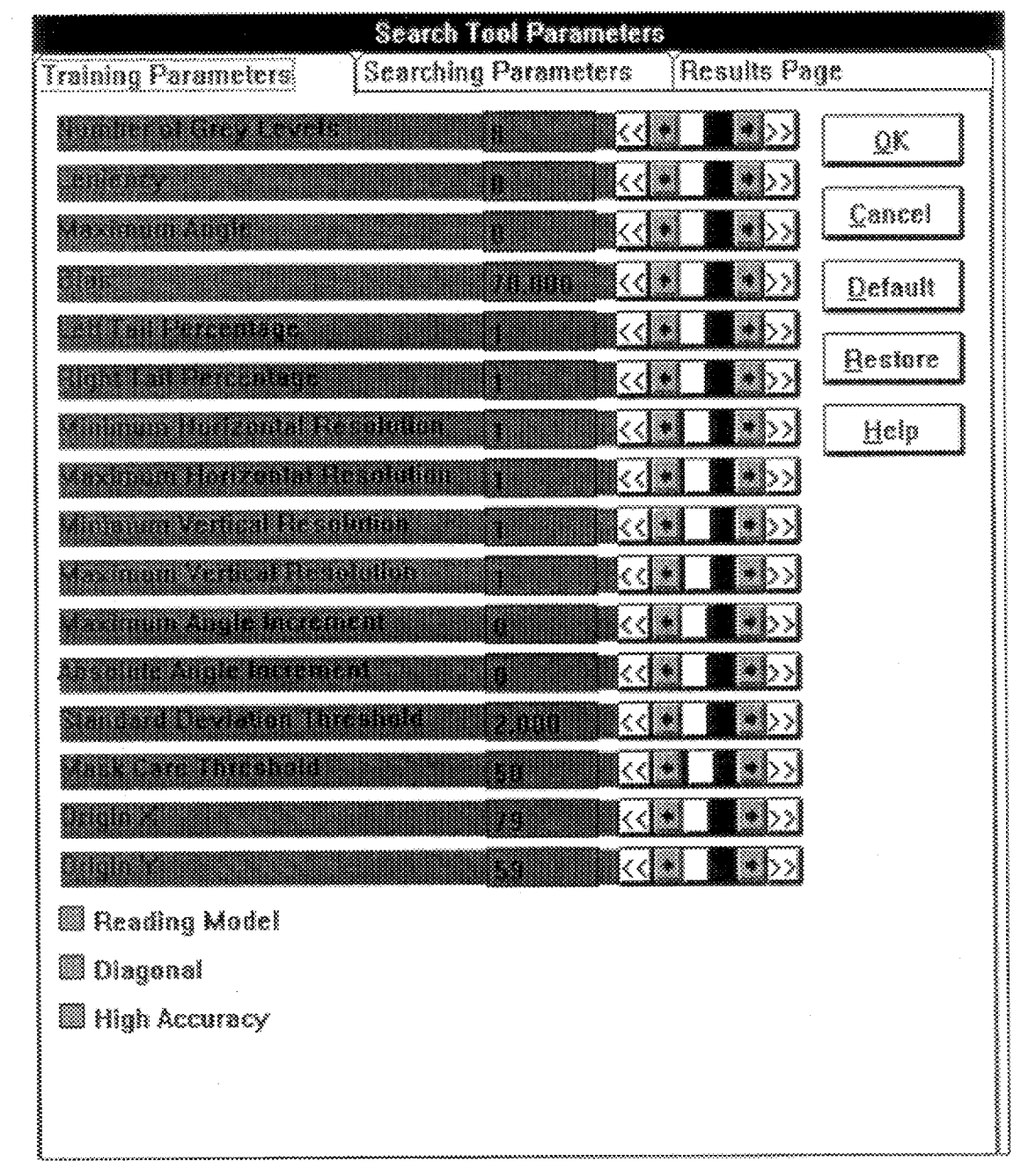
Figure 21:
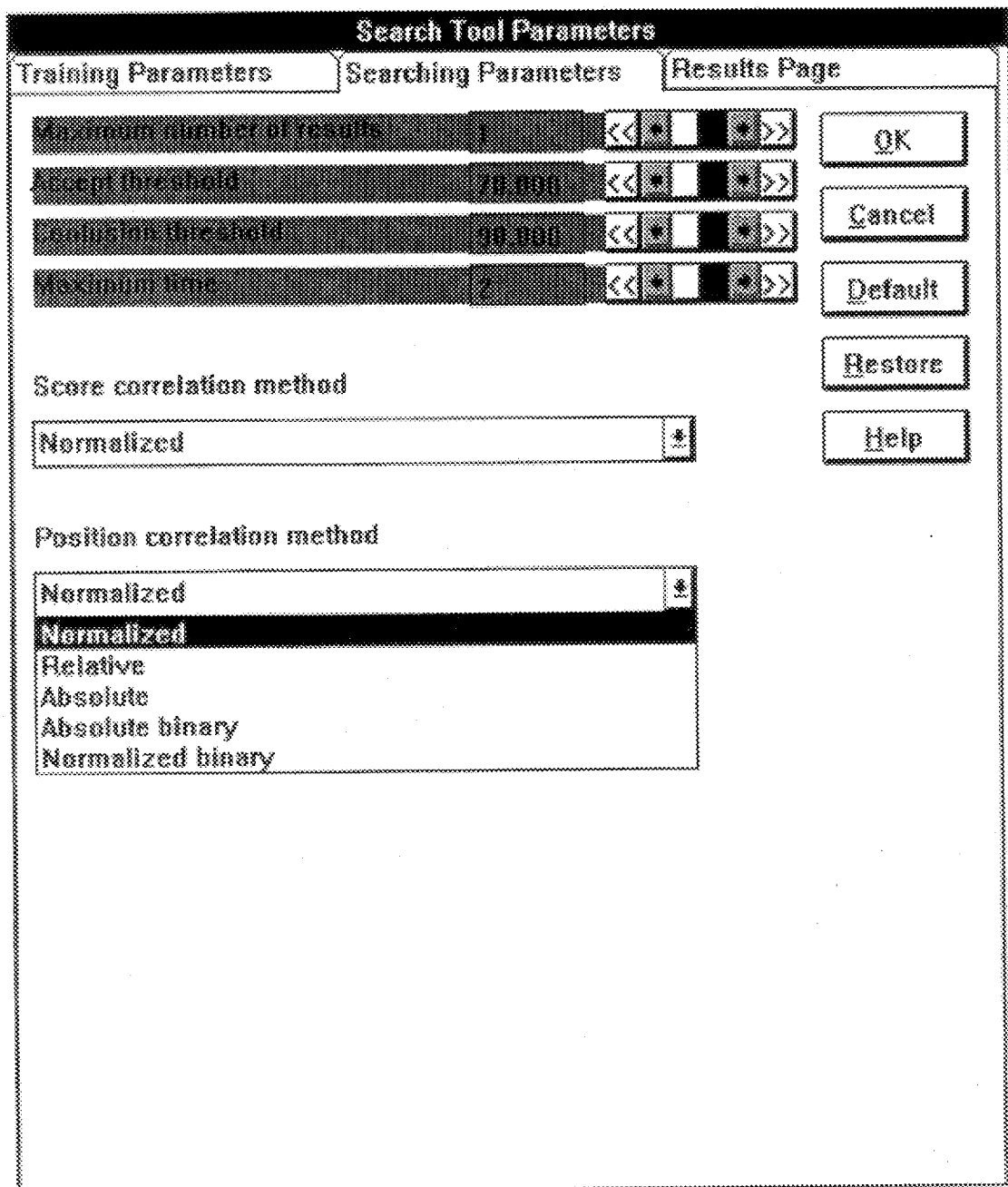
Figure 22:
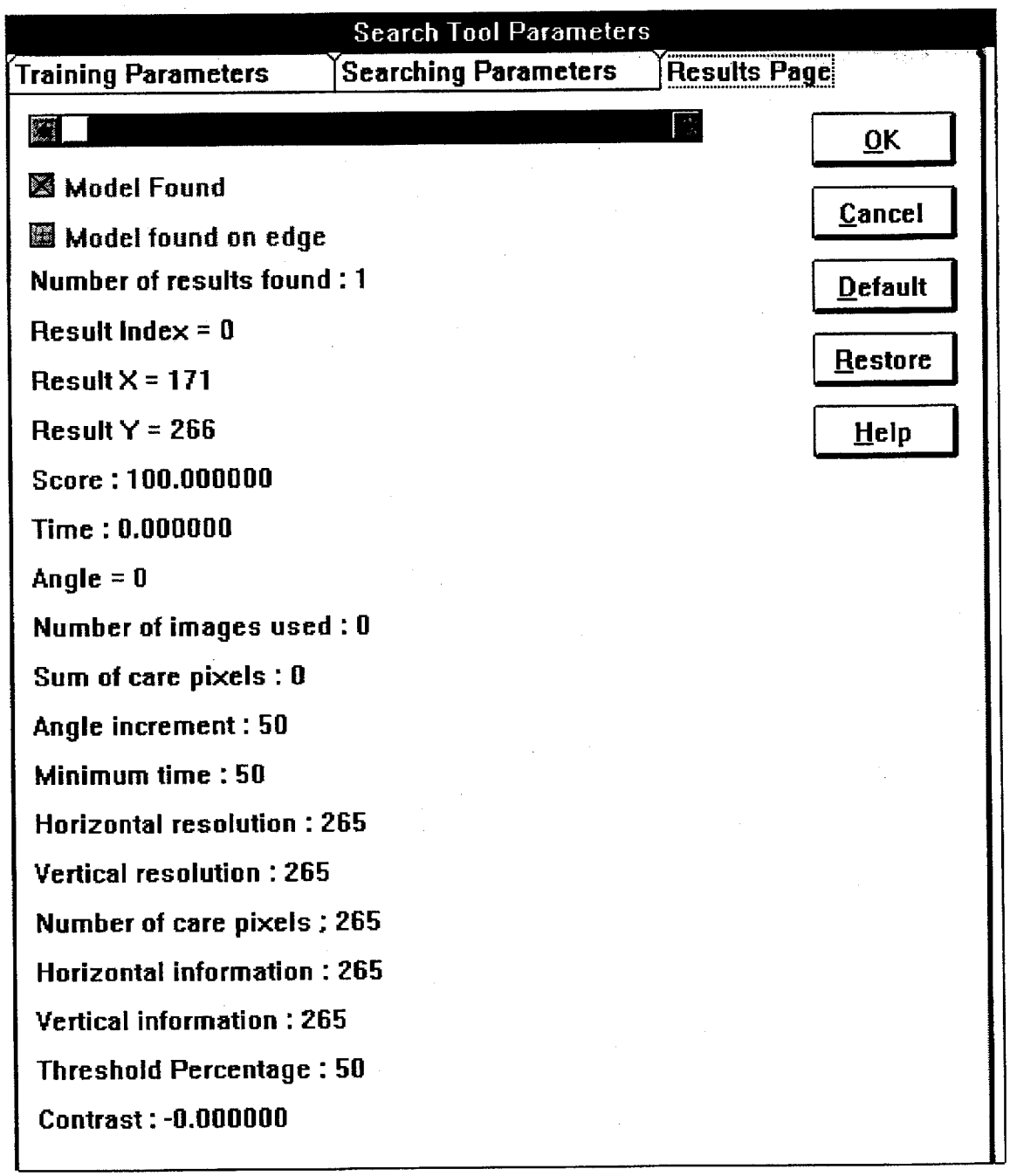
Figure 23:
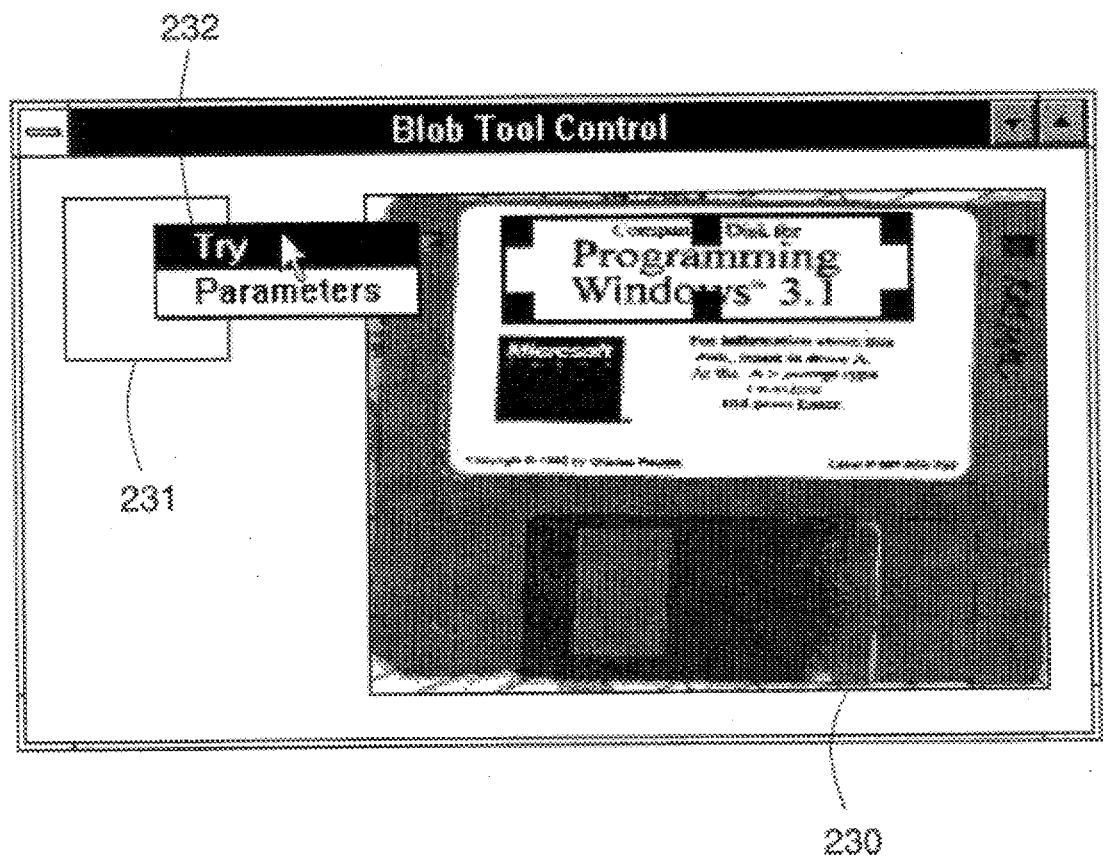

FIG. 20 illustrates a screen which is called from the search tool popup menu and is used to set training parameters. FIG. 21 illustrates a screen which is also called from the search tool popup menu and is used to set search parameters. Finally, FIG. 22 illustrates a screen also called from the search popup menu and is used to view the search results.

Search Tool Example
  Place two EditableImage controls onto a Form. Place one Editable Shape control on each EditableImage control and set the Visible property of these Editable Shapes to False. Place a Search Tool onto the form, then paste the following code into the declarations section of the form:

```
Sub Form_Load( )
SearchTool1.hTrainingImage=EditableImage1
SearchTool1.hSearchingImage=EditableImage2
EditableImage1.hRegionOfInterestShape
=EditableShape1
EditableImage2.hRegionOfInterestShape
=EditableShape2
End Sub
```

Error Messages, Search Tool Control
  The following table lists the trappable errors for the Search Tool control.

| Error number | Message explanation |
| --- | --- |
| 32001 | HTRAININGIMAGE_NOT_DEFINED<br>A training image must be defined.<br>This error is caused by attempting to train a feature model when the hTrainingImage property is not set. |
| 32002 | HSEARCHINGIMAGE_NOT_DEFINED<br>A searching image must be defined.<br>This error is caused by attempting to search for a feature model when the hSearchingImage property is not set. |
| 32003 | HRESULTPOINT_NOT_DEFINED<br>A result point must be defined.<br>This error is caused by attempting to search for a feature model when the hResultPoint property is not set. | hResultPoint Property, Search Tool Control
  Description
    Sets or returns the Point in which to return the location of the feature model as found by the last Search method. This property is not available at design time.
  Visual Basic
    [form.]SearchTool .hResultPoint[=hCtl%]
  Visual C++
    pSearchTool→GetNumProperty ("hResultPoint")
    pSearchTool→SetNumProperty ("hResultPoint", hCtl);
  Remarks
    This property should be set before searching for a feature model. It should be set to the hCtl property of a Point control which is on the hSearchingImage. When the Search method is called, the Point will be set to the location at which the feature model was found. If MaximumNumberOfResults is more than one, set the hResultPoint property to an array of Points. The array should have at least MaximumNumberOfResults entries. The location result may also be accessed through the ResultX and ResultY properties.
  Data Type
    Long hTrainingImage, hSearchingImage Property, Search Tool Control Description Sets or returns the Editable Images to be used by Train and Search.

Visual Basic

[form.]SearchTool.hTrainingImage[=hCtl&]
[form.]SearchTool.hSearchingImage[=hCtl &]

Visual C++ pSearchTool→GetNumProperty ("hTrainingImage");
pSearchTool→SetNumProperty ("hTrainingImage", hctl);
pSearchTool→GetNumProperty ("hSearchingImage");
pSearchTool→SetNumProperty ("hSearchingImage", hctl);

Remarks

These properties must be set before training a feature model or searching for a feature model. They should be set to the hCtl property of an Editable Image control. It is possible to making the training and searching image the same by setting hTrainingImage and hSearchingImage to the same hCtl of the same Editable Image. Both the training image and the searching images should normally have a region of interest defined by setting the hRegionOfInterestShape property of Editable image.

Data Type

Long.

Blobs Tool Control

Description

Referring now to FIGS. 23–27, the Blobs Tool control (at area 231) is a vision tool which computes various geometric, topological and other properties of objects within an editable image 230. The image is segmented into groups of connected pixels (blobs), and then properties such as area, perimeter, and orientation are computed and can be individually retrieved.

Various properties and methods allow the Blobs finding process to be controlled. These properties and methods can be accessed at design time and also at run time through a context sensitive popup menu 232. This menu can be accessed by clicking with the right mouse button on the Blobs Tool control.

File Name

VISION.VBX

Object Type

Blobs Tool

Remarks

Figure 24:
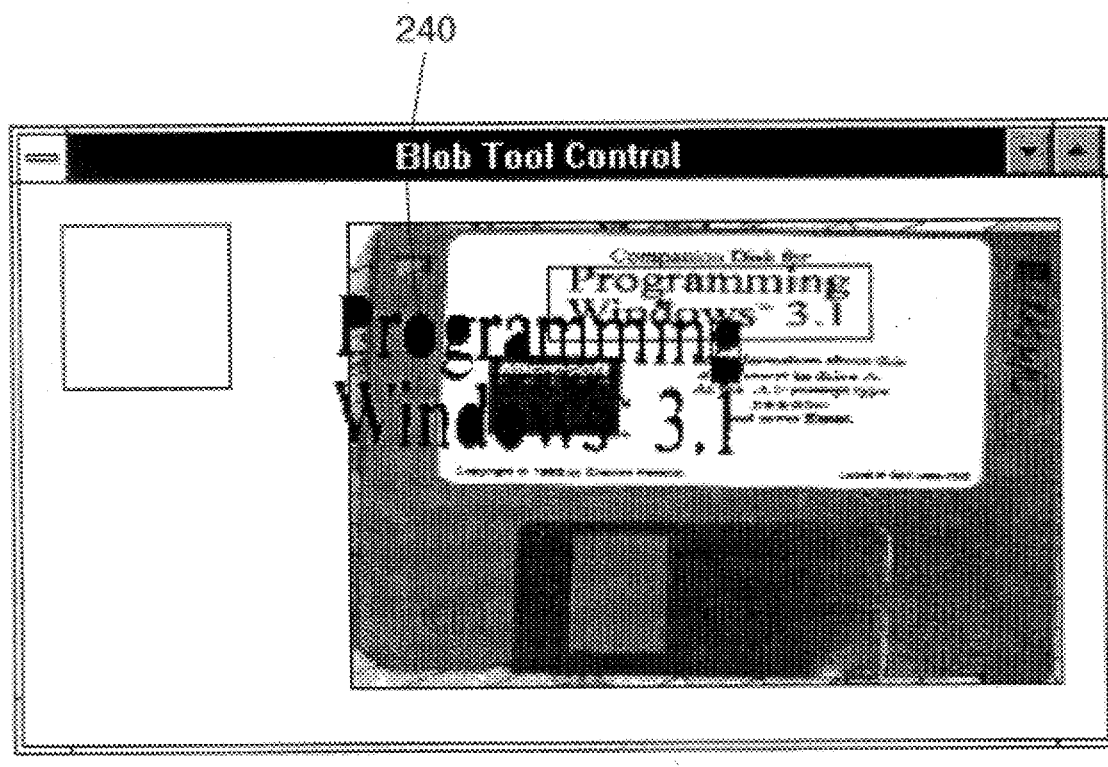

The Blobs Tool has both a graphical user interface and a code interface. To use the Blobs Tool, do the following:

1) The control must first be linked to an Image by setting the himage property. The image should have its hRegionOfInterestShape property set.
2) Position an editable shape (i.e. 235 in FIG. 23) to define the region in which blobs are to be found.
3) Find the blobs (as illustrated in FIG. 24 at area 240) by either selecting Try from the popup menu, or by calling the Find method.
4) The Blobs results may now be accessed through the relevant properties.

Figure 25:
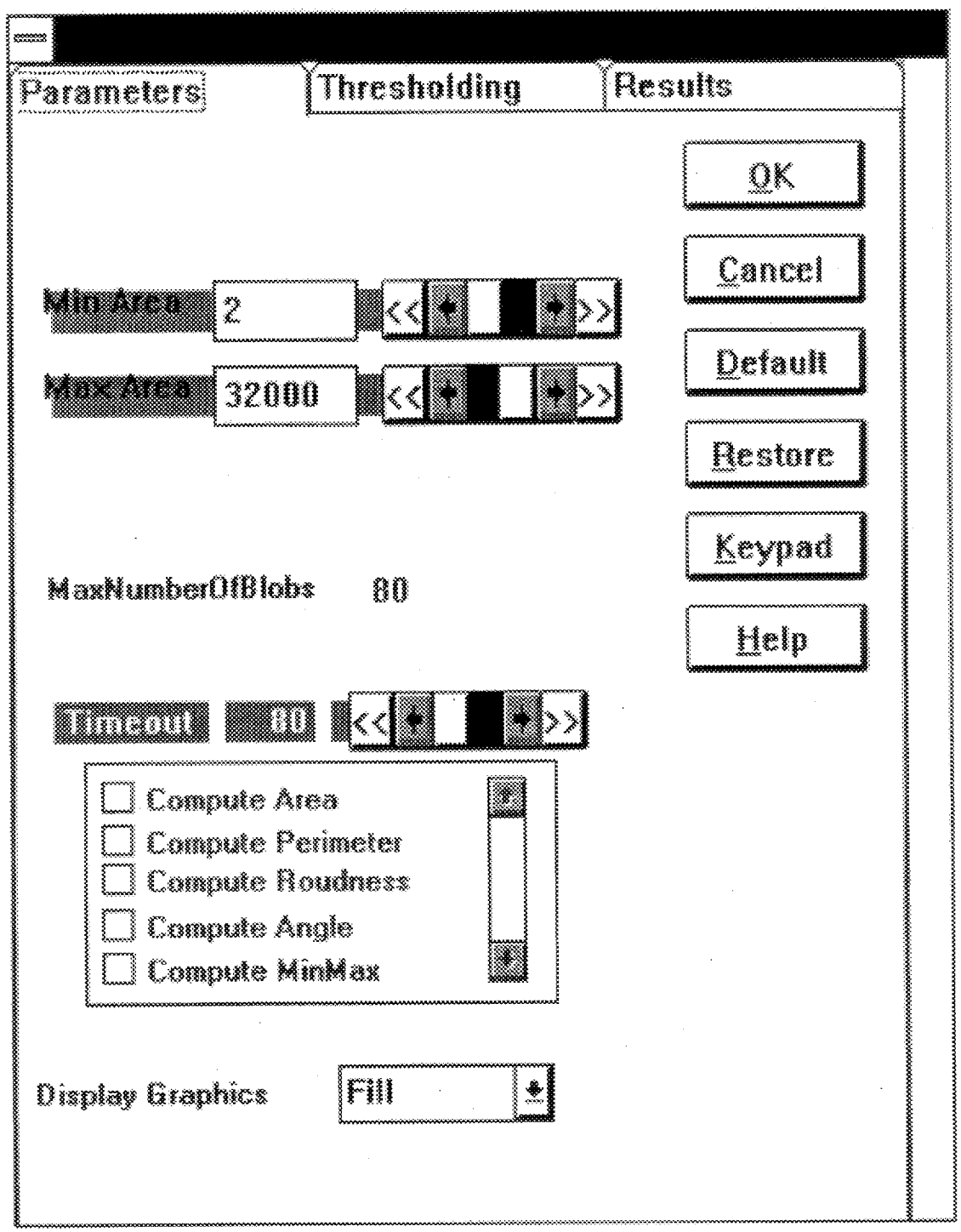
Figure 26:
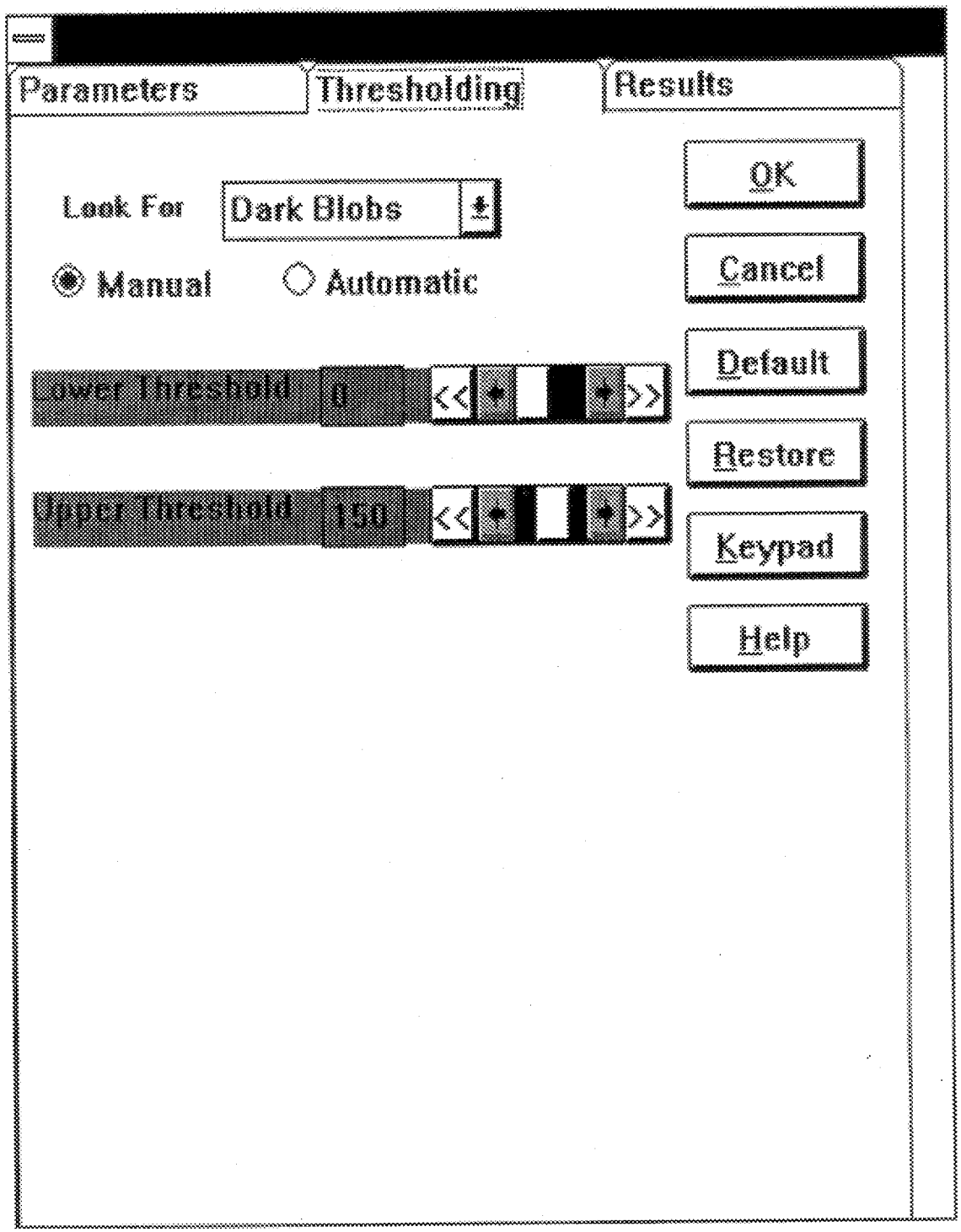

The screen of FIG. 25 is called from the menu 232 and is used to set/view the blob analysis parameters. The screen of FIGS. 26 and 27 are also called from the menu 232 and is used to set/view blob analysis thresholds. The screen of FIG. 27 is also called from the menu 232 and is used to set/view the blob analysis parameters.

Blobs Tool Example

Place an Editable Image control onto a form, place an Editable Shape control on the image, place a Blobs Tool onto the form, and then past the following code into the declarations section of your form:

```
Sub Form_Load( )
    BlobsTool1.hImage=EditableImage1
    EditableImage1.hRegionOfInterestShape
    =EditableShape1
End Sub
```

Error Messages, Blobs Tool Control

The following table lists the trappable errors for the Blobs Tool control.

| Error number | Message explanation |
| --- | --- |
| 32001 | HIMAGE_NOT_DEFINED<br>This error is caused by attempting to find blobs when the hImage property is not set. |

Point Control

Description

Figure 28:
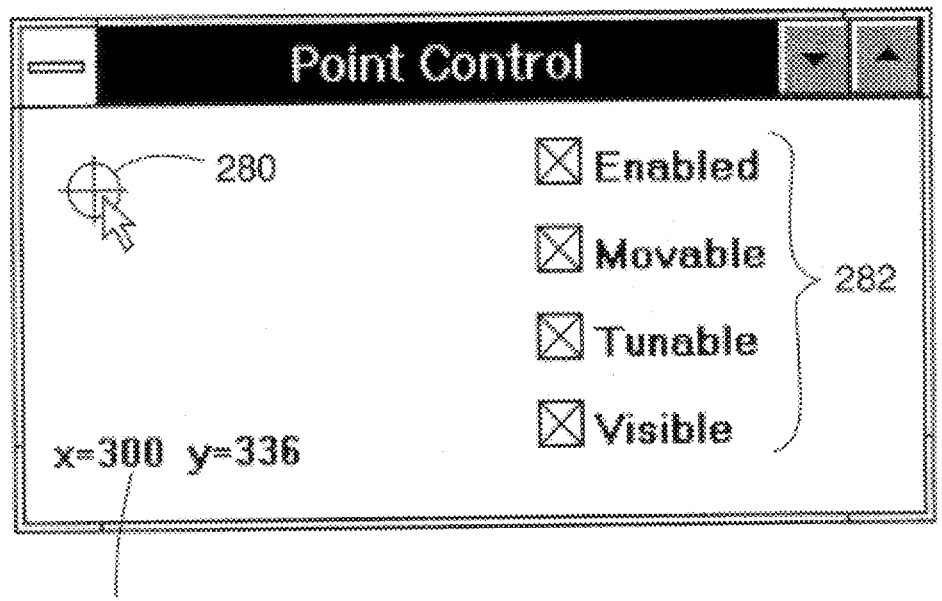
FIGS. 28–29 are screen displays associated with a point custom control.
Figure 29:
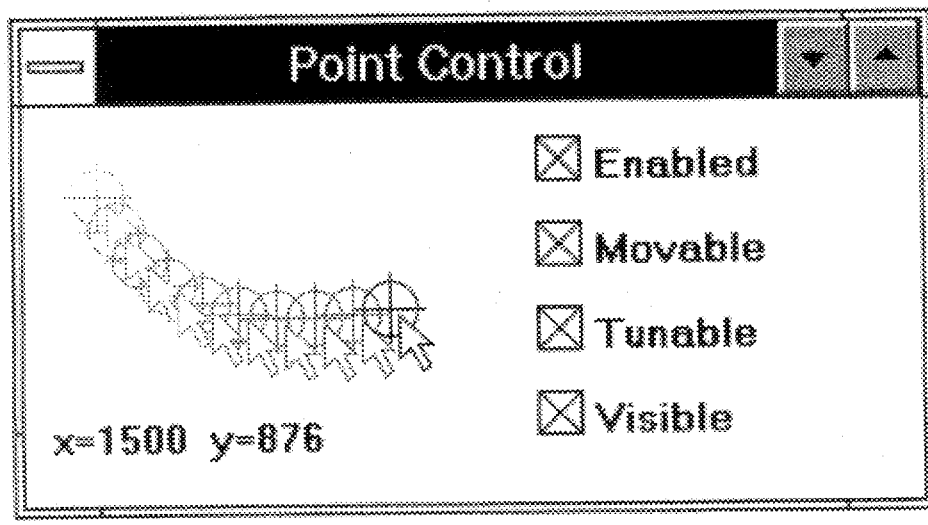

Referring now to FIGS. 28 and 29, point, as represented by icon 280, is a Visual Basic custom control that provides a Geometric Point entity which can be interactively edited by its user at both design and run-time as illustrated by point editing options 282. Coordinates of the point in pixels is illustrated at area 283.

File Name

VISION.VBX

Object Type

Point

Remarks

Points can be selected and moved interactively at run-time using the mouse as illustrated in FIG. 29. The coordinates are updated as the point icon is moved.

Point position can be finely tuned (i.e. tunable option) by:

Using a special toolbar that moves a Point by one pixel in the required direction.

Pressing Cursor Keys on the keyboard when the Point is selected.

Pressing the Left Mouse Button when the mouse is in a Nudge Zone. These are areas around the point which cause the cursor to change shape. Pressing the Left mouse button when the cursor is one of these Nudge Cursors will cause the Point to move one Pixel in the relevant direction.

The application programmer can prevent the end user from moving, selecting, or fine tuning Points by setting the relevant property to False.

Point Control Example Code

The following example is a simple application that demonstrates the Point custom control. It consists of a minimal User interface that sets the properties of a point at runtime. It also demonstrates property retrieval and custom events by writing some text on the screen that indicates the position of the point after it has been moved.

To use the example, take the following steps:

1. Make sure that the file VISION.VBX has been added to the project.
2. Create the User Interface:

Place CheckBox controls on the default Visual Basic Form. The names of the four CheckBox controls should remain at default (i.e. Check1, Check2, Check3 and Check4).

Optional: set the CheckBox controls' Caption properties as follows:

| CheckBox | Caption |
|---|---|
| Check1 | Enabled |
| Check2 | Movable |
| Check3 | Tunable |
| Check4 | Visible |

Place a Label control on the form. The control's Name should be Label1.

Place a Point custom control on the form. The control's Name should be Point 1.

3. Add the code.

Paste the following code in the Declarations section of the form:

```
Sub Check1_Click( )
    If Check1.Value = 0 Then
        Point1.Enabled = False
    Else
        Point1.Enabled = True
    End If
End Sub
Sub Check2_Click ( )
    If Check2_Click( )
        Point1.Movable = False
    Else
        Point1.Movable = True
    End If
End Sub
Sub Check3_Click( )
    If Check3.Value = 0 Then
        Point1.Tunable = False
    Else
        Point1.Tunable = True
    End If
End Sub
Sub Check4_Click ( )
    If Check4.Value = 0 Then
        Point1.Visible = False
    Else
        Point1.Visible = True
    End If
End Sub
Sub Point1_Move ( )
    label1.Caption = "x=" & Point1.X & " y=" & Point1.Y
End Sub
```

Add the following code in the default form's Load event:
Initialize the Check boxes at start of program
If Point1.Enabled=True Then Check1.Value=1
If Point1.Movable=True Then Check2.Value=1
If Point1.Tunable=True Then Check3.Value=1
If Point1.Visible=True Then Check4.Value=1

4. Press F5 to run the example.

Editable Shape Control

Description

Figure 30:
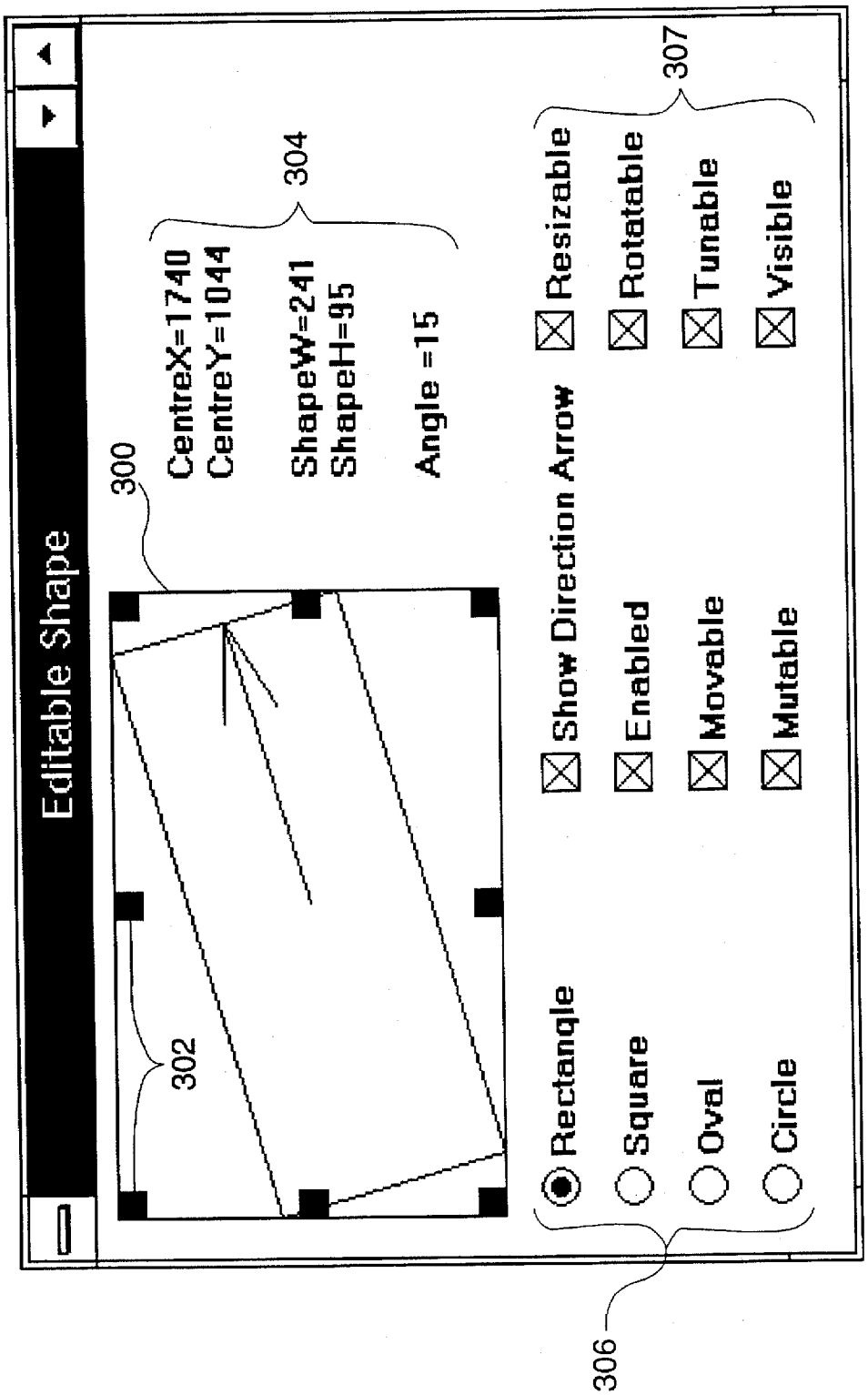
FIGS. 30–31 are screen displays associated with a editable shape custom control.
Figure 31:
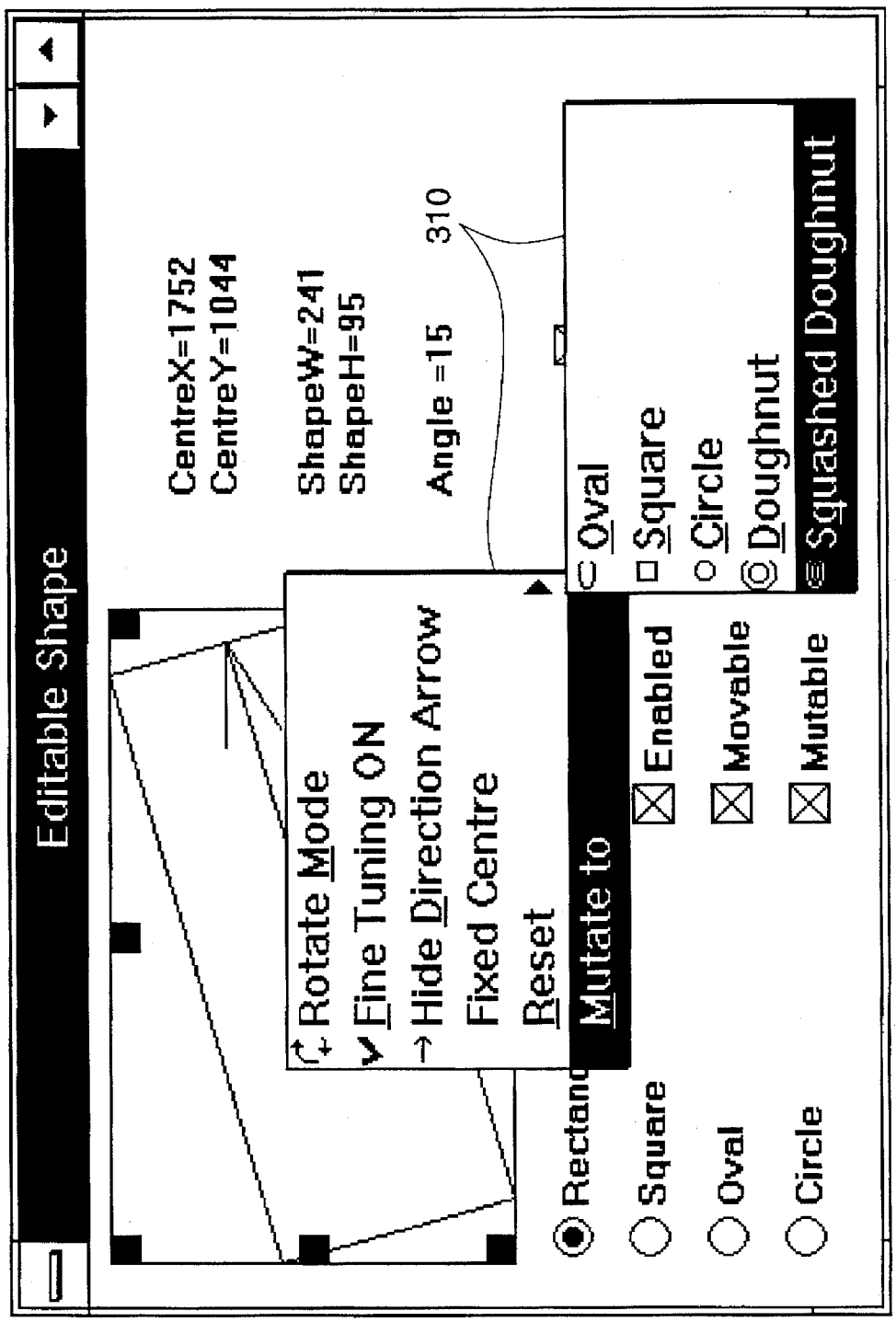

Referring now to FIGS. 30 and 31, EditableShape is a Visual Basic custom control which provides two dimensional geometric shapes that can be interactively edited. Within an area 300 are located interactive sizing handles 302.

File Name
  VISION.VBX
Object Type
  EditableShape
Remarks

This custom control is like the Visual Basic Shape control but can be edited both at design time and by the end user at run-time. Furthermore, the user is able to interrogate the attributes of a shape such as its width, height, rotation etc. as illustrated at area 304.

Like the Visual Basic custom control: Shape, Editable-Shape can take the form of an ellipse, rectangle, circle, or square as illustrated at area 306. At Runtime it can be selected, rotated, moved, resized and "mutated" to another shape interactively by the use of a mouse as illustrated by shape editing options 307.

Like the Point custom control, the EditableShape can also be finely tuned using a similar toolbar. The centre button in the toolbar allows the user to change the fine-tune mode. By default, this is MOVEMODE (pressing the arrows will move the shape by one pixel in the relevant direction). The mode can also be ENLARGEMENT or SHRINKMODE. Pressing the arrows will cause the shape to be enlarged or shrunk by one pixel on the relevant corner of the shape's bounding rectangle.

The application programmer can prevent the user from moving, resizing, changing shape, rotating, selecting or fine-tuning an EditableShape by setting the appropriate property to False. FIG. 31 illustrates popup menus 310 for run time shape editing.

Editable Shape Example Code

The example demonstrates features of an EditableShape custom control using a minimal user interface.

To use the example take the following steps:

1. Add the file VISION.VBX to a new Visual Basic project.
2. Create the User Interface:
    Place eight CheckBox controls on the default Visual Basic form. By default, the name of these controls should be Check1, Check 2, . . . , Check8.
    Give the following Captions to the controls just created.

| Control | Caption |
|---|---|
| Check1 | Show Direction Arrow |
| Check2 | Enabled |
| Check3 | Movable |
| Check4 | Mutatable |
| Check5 | Resizable |
| Check6 | Rotatable |
| Check7 | Tunable |
| Check8 | Visible |

Place four OptionButton controls and give them the Name Option1. Answer yes when asked "Do you want to create a control array?". Give the controls the following captions:

| Control | Caption |
|---|---|
| Option1 (0) | Rectangle |
| Option1 (1) | Square |
| Option1 (2) | Oval |
| Option1 (3) | Circle |

Place three labels on the form. The names of these Label controls should be Label1, Label2 and Label3.
Place an Editable Shape custom control on the form, this should be named EditableShape1.

3. Add the code.
    Paste the following code in the Declarations section of the form:

```
Sub Check1__Click ( )
    EditableShape1.DirectionArrow=Check1.Value
End Sub
Sub Check2__Click ( )
    EditableShape1.Enabled = Check2.Value
    UpdateCheckBoxes
End Sub
Sub Check3__Click ( )
    EditableShape1.Movable = Check3.Value
    UpdateCheckBoxes
End Sub
Sub Check4__Click ( )
    EditableShape1.Mutatable = Check4.Value
    UpdateCheckBoxes
End Sub
Sub Check4__Click ( )
    EditableShape1.Mutatable = Check4.Value
    UpdateCheckBoxes
End Sub
Sub Check5__Click ( )
    EditableShape1.Resizable = Check5.Value
    UpdateCheckBoxes
End Sub
Sub Check6__Click ( )
    EditableShape1.Rotatable = Check6.Value
    UpdateCheckBoxes
End Sub
Sub Check7__Click ( )
    EditableShape1.Tunable = Check7.Value
    UpdateCheckBoxes
End Sub
Sub Check8__Click ( )
    EditableShape1.Visible = Check8.Value
End Sub
Sub EditableShape1__Move ( )
    Label1.Caption  =  "CentreX="           &
    EditableShape1.ShapeWidth & "  ShapeH="  &
    EditableShape1.ShapeHeight
Sub EditableShape1__Resize ( )
    Label2.Caption  =  "ShapeW="           &
    EditableShape1.ShapeWidth & "ShapeH+"   &
    EditableShape1.ShapeHeight
End Sub
Sub EditableShape1__Rotate ( )
    Label3.Caption = "Angle ="              &
    EditableShape1.Roll
End Sub
Sub UpdateCheckBoxes ( )
    Check1.Value                            =
    Abs (EditableShape1.DirectionArrow)
    Check2.Value = Abs(EditableShape1.Enabled)
    Check3.Value = Abs(EditableShape1.Movable)
    Check4.Value = Abs(EditableShape1.Mutatable)
    Check5.Value = Abs(EditableShape1.Resizable)
    Check6.Value = Abs(EditableShape1.Rotatable)
    Check7.Value = Abs(EditableShape1.Tunable)
    Check8.Value = Abs(EditableShape1.Visible)
End Sub
```

Add the following code in the default form's Load event:

```
UpdateCheckBoxes
Option1(EditableShape1.Shape.Value = True
```

Add the following code to Option 1's Click event:
    EditableShape1. Shape=Index
4. Press F5 to run the example.

Stage Control

Description

Figure 32:
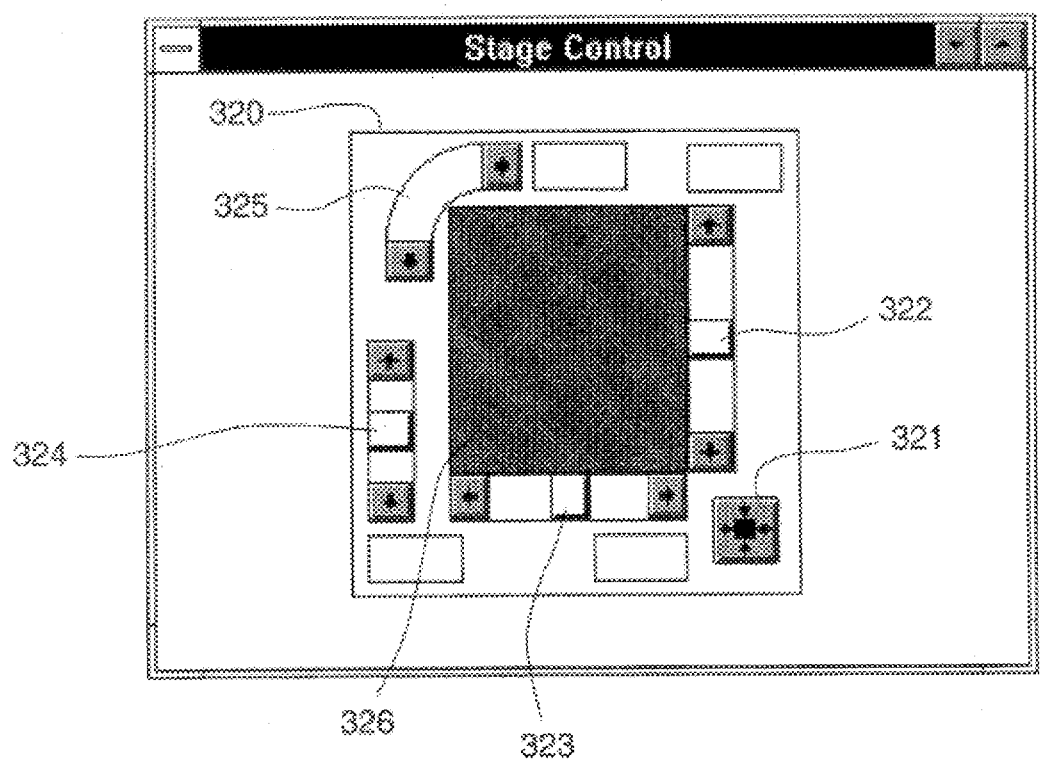
FIG. 32 is a screen display associated with a stage custom control.

Referring now to FIG. 32, the Stage control provides facilities to control multi-axis stage hardware. The Stage control can control stage hardware which moves in X, Y, and Z axes, and which rotates around each axis (roll, pitch and yaw). The stage can be moved to an arbitrary (X,Y,Z,roll, pitch,yaw) position, moved to a home position, and moved to a number of stored positions.

Various properties and methods allow the stage to be controlled. These properties and methods can be accessed at design time through a code interface and also at run time through an interactive graphical user interface at area 320.

The Graphical User Interface 320 provided to control the stage manually provides facilities to move the stage in X,Y and Z axes and to change the roll of the stage. The point in the X/Y plane corresponding to the roll axis of rotation can also be moved. A Home operation is also provided by home button 321.

File Name
    VISION.VBX
Object. Type
    Stage
Remarks

Before the Stage control can be used, the control must first be linked to some particular type of stage hardware and at least one Editable Shape by setting the Stage and hStageShape properties.

To use the graphical interface 320, adjust the X (322), Y (323), Z (324), roll (325), Pitch and yaw scrollbars, or enter position values explicitly in the text boxes. Methods and properties can be accessed through a context sensitive popup menu. This menu can be accessed by clicking with the right mouse button on the stage control.

Error Messages, Stage Control

The following table lists the trappable errors for the Stage control.

| Error number | Message explanation |
| --- | --- |
| 32001 | HIT__HARD__LIMIT<br>Stage hit hard limit.<br>This error is caused by attempting to move the stage beyond one of its hard limits. |
| 32002 | OUT__OF__BOUNDS<br>Attempt to move stage out of bounds.<br>This error is cause by attempting to move the stage outside its bounds, as specified by the hBoundsShape property. |
| 32003 | STILL__MOVING<br>Attempt to move stage while still moving. This error is caused by attempting to move the stage while it is still moving. |
| 32004 | STAGE__NOT__DEFINED<br>Attempt to move stage will still moving.<br>This error is caused by trying to access the physical stage when the Stage property is not set. |
| 32005 | CALIBRATION__NOT__DEFINED<br>A calibration must be defined.<br>This error is caused by trying to access the physical stage when the hCalibration property is not set. |

| Error number | Message explanation |
|---|---|
| 32006 | STAGE_SHAPE_NOT_DEFINED<br>A physical stage shape must be defined.<br>This error is caused by trying to access the physical stage when the hStageShape property is not set. |

Stage Control Example

Place a Stage control onto a Form, place two Editable Shape controls onto the Stage control 326 (to define stage shape and bounds), and then paste the following code into the declarations section of the form:

```
Sub Form_Load ()
    Stage1.Stage = XYYStage1.hCtl
    Stage1.hStageShape = Editable Shape1.hCt1
    Stage1.hBoundsShape = EditableShape2.hCt1
    a% = Stage1.Home
End Sub
Sub Form_Click ()
    Stage1.DestinationX = 20
    Stage1.DestinationY = 30
    Stage1.Destination Roll = 45
    Stage1.Move
End Sub
```

Stage Property, Stage Control

Description

Sets or returns the particular type of stage hardware. This property is not available at design time.

Visual Basic

[form.]Stage.Stage[=stage&]

Visual C++ pStage→GetNumProperty ("Stage")
  pStage→SetNumProperty ("Stage", pXYZCompanyStage)

Remarks

This property may be set to the Stage property of an XYZCompanyStage Control, or from another source which provides a compatible property.

Data Type

Long.

hStageShape Property, Stage Control

Description

Sets or returns the shape of the stage. This property is not available at design time.

Visual Basic

[form.]Stage .hStageShape[=hCtl&]

Visual C++ pStage→GetNumProperty ("hStageShape")
  pStage→SetNumProperty ("hStageShape", hCtl)

Remarks

This property should be set to the hCtl property of an Editable Shape Control. The graphical properties of the Editable Shape such as BorderColor can be set, but do not set the Shape, size, position or Roll properties of the Editable Shape, as these will be modified automatically by the State Control.

Data Type

Long.

Type1 Stage Control

Description

Figure 33:
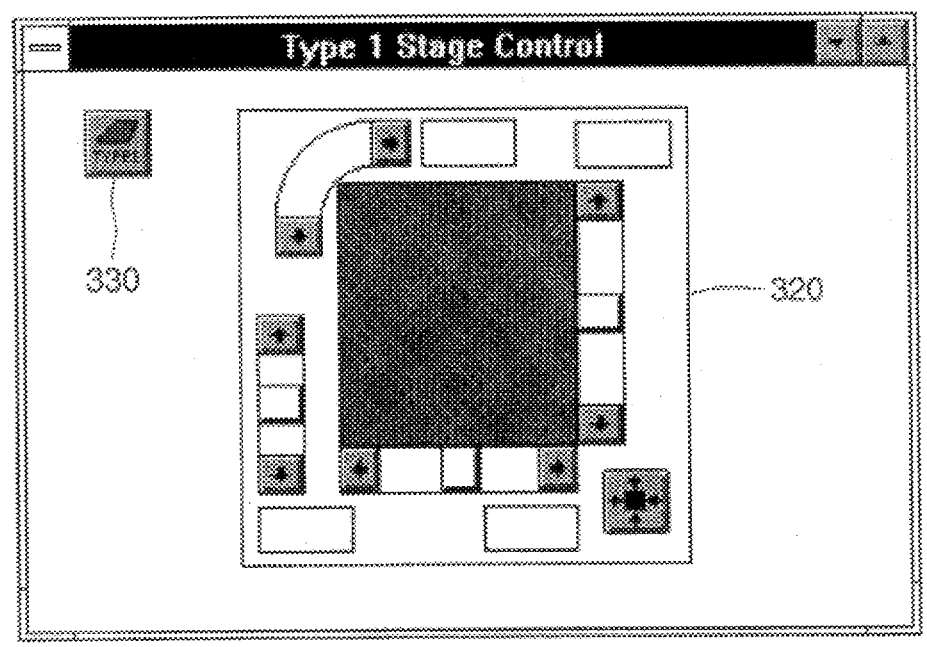
FIG. 33 is a screen display associated with a Type1 stage custom control.

Referring to FIG. 33, the Type1 Stage Control is a run-time invisible control which provide an implementation of the Stage property for use by the Stage Control. The Type1 Stage Control does not directly move the motors to move the table—this control provides properties, methods and events to enable the motors to be moved from top level application code, and yet allow the application to use the standard Stage Control.

File Name

VISION.VBX

Object Type

Type1Stage

Remarks

To use the Type1 Stage Control, set the Stage property of the Stage Control equal to the Stage property of the Type1 Stage Control at run time.

Type1 Stage Example

Place a Stage Control and an Type1 Stage Control (i.e., icon 330) onto a Form (to define the hardware and software interface to the Type1 stage), place two Editable Shape controls onto the Stage control, and then paste the following code into the declarations section of the form:

```
Sub Form_Load ()
    Stage1.Stage = Type1Stage.hCt1
    Stage1.hStageShape = EditableShape1.hCt1
    Stage1.hBoundsShape = EditableShape2.hCt1
End Sub
```

Stage Property, Type1 Stage Control

Description

Returns a value which can be used for the Stage property of the Stage Control. This property is read-only at run time, not available at design time.

Visual Basic

[form.]Type1Stage.Stage

Visual C++

PType1Stage→GetNumProperty ("Stage")

Remarks

Set the Stage property of the Stage Control equal to this property at run time.

Data Type

Long.

Type2 Stage Control

Description

The Type2 Stage Control is a run-time invisible control which provide an implementation of the Stage property for use by the Stage Control.

File Name

VISION.VBX

Object Type

Type2Stage

Remarks

To use the Type2 Stage Control, set the Stage property of the Stage Control equal to the Stage property of the Type2 Stage Control at run time.

Type2 Stage Example

Place a Stage Control and an Type2 Stage Control onto a Form, place two Editable Shape controls onto the Stage control, and then paste the following code into the declarations section of the form:

```
Sub Form_Load ()
Stage1.Stage=Type2Stage1.hCtl
Stage1.hStageShape=EditableShape1.hCtl
Stage1.hBoundsShape=EditableShape2.hCtl
End Sub
```

Stage Property, Type2 Stage Control
Description
Returns a value which can be used for the Stage property of the Stage Control. This property is read-only at run time, not available at design time.
Visual Basic
[form.]Type2Stage.Stage
Visual C++
pType2Stage→GetNumProperty ("Stage")
Remarks
Set the Stage property of the Stage Control equal to this property at run time.
Date Type
Long.
Type3 Stage Control
Description
The Type3 Stage Control is a run-time invisible control which provide an implementation of the Stage property for use by the Stage Control.
File Name
VISION.VBX
Object Type
Type3Stage.
Remarks
To use the Type3 Stage Control, set the Stage property of the Stage Control equal to the Stage property of the Type3 Stage Control at run time.
Type3 Stage Example
Place a Stage Control and a Type3 Stage Control onto a Form, place two Editable Shape controls onto the Stage control, and then paste the following code into the declarations section of the form:

```
Sub Form_Load ()
Stage1.Stage=Type3Stage1.hCtl
Stage1.hStageShape=EditableShape1.hCtl
Stage1.hBoundsShape=EditableShape2.hCtl
End Sub
```

Stage Property, Type3 Stage Control
Description
Returns a value which can be used for the Stage property of the Stage Control. This property is read-only at run time, not available at design time.
Visual Basic
[form.]Type3Stage.Stage
Visual C++
pType3Stage→GetNumProperty ("Stage")
Remarks
Set the Stage property of the Stage Control equal to this property at run time.
Data Type
Long.
Toolbar Control
Description
The Toolbar control allows you to create a context-sensitive toolbar for navigating the windows and menus in the application using simple button clicks. It is generally used as a graphical replacement for the main menu bar of the application. Buttons for window selection, sub-window selection and popup menu selection can be added to the toolbar, as well as custom buttons for specific commands. Custom buttons may be volatile, i.e. appearing only in a specific context, or fixed, i.e. always visible. Some predefined fixed buttons are provided for common commands such as Help, Undo, Print, Save, Open, and Exit. The route taken through the menu levels to the current menu is shown at the tope of the toolbar, providing a visual reminder of the route and also allowing the user to instantly jump back to any level.
File Name
VISION.VBX
Object Type
Toolbar
Remarks
To add any type of button you must first set the Button Type property.
To add window selection buttons to the toolbar, you must set the WindowIndex property, and then set the WindowhWnd property. This must be done at run-time. Buttons for sub-windows and popup menus may be similarly added.
To add a popup menu to the toolbar you must set the Windowindex property, set the SubWindowIndex property, and then set the WindowhMenu property. The SubWindow must be previously defined.
To add a custom fixed command button, set the ButtonIndex property to an unused button index, and set the ButtonPicture and ButtonCaption properties. This may be done only at run time.
Predefined fixed command buttons such as the Help button may be enabled/disabled by setting the appropriate Visible property to True, e.g. HelpButtonVisible.
To add a custom volatile command button, use the WindowIndex and SubWindowindex properties to navigate to the desired context, set the ButtonIndex property to an unused button index, and set the ButtonPicture and ButtonCaption properties. This may be done only at run time.
Default captions are generated for each button but may be overridden. For example, to change the default caption for a window selection button, set the ButtonType property, set the WindowIndex property to the desired window, and then set the ButtonCaption property. This may be done only at run time.
ButtonType Property, Toolbar Control
Description
Sets the type of the buttons.
Visual Basic
[form.]Toolbar.ButtonType[={Fixed|Volatile|Popup|Window}]
Visual C++
pToolbar→SetNumProperty("ButtonType", {Fixed|Volatile|Popup|Window})
Remarks
Fixed buttons are always visible at the right hand end of the toolbar. Volatile buttons are attached to a particular window or sub window, visible only when the buttons for that particular window are visible. All Volatile buttons defined for one menu are kept in all the submenus.
Data Type
Integer
WindowIndex, SubWindowIndex Properties, Toolbar Control
Description
Sets or returns the currently selected window or sub-window.

Visual Basic
[form.]Toolbar.ButtonType[={Window}]
[form.]Toolbar.WindowIndex[=index%]
[form.]Toolbar.SubWindowIndex]

Visual C++
pToolbar→SetNumProperty("ButtonType", {WINDOW})
pToolbar→SetNumProperty("Windowindex"),index)
pToolbar→SetNumProperty("SubWindowIndex", index)

Remarks

The window index and sub-window index can be used to both set and get the currently selected windows. The indexes are numbered from zero, −1 means no current selection. It is necessary to set the indexes in order to add new windows and menus to the structure of the toolbar, and also to override default button captions.

Data Type
Integer.

WindowhMenu Property, Toolbar Control
Description
Sets or returns the hMenu of the popup menu of the currently selected window or sub-window. Not available at design time.

Visual Basic
[form.]Toolbar.ButtonType[={Window}]
[form.]Toolbar.WindowIndex[=index%]
[form.]Toolbar.SubWindowIndex[=index%]
[form.]Toolbar.WindowhMenu[=handle%]

Visual C++
pToolbar→SetNumProperty("ButtonType", {WINDOW})
pToolbar→SetNumProperty("WindowIndex", index)
pToolbar→SetNumProperty("SubWindowIndex", index)
pToolbar→GetNumProperty("WindowhMenu")
pToolbar→SetNumProperty("WindowhMenu", handle)

Remarks

When a popup menu is added to the toolbar, a button is added for each menu option and each submenu option. By default, the caption is taken from the menu itself.

To add a new popup menu set of buttons to the toolbar, set the ButtonType property, set the WindowIndex property to the appropriate window index number, set SubWindowindex to the appropriate window index number, and then set the WindowhMenu property to the HMENU of the popup menu.

Data Type
Integer.

ButtonIndex Property, Toolbar Control
Description
Sets or returns the current volatile/fixed/popup button index.

Visual Basic
[form.]Toolbar.ButtonType[={Fixed|Volatile|Popup|Window}]
[form.]Toolbox.ButtonIndex[=index%]

Visual C++
pToolbar→SetNumProperty("ButtonType", {FIXED|VOLATILE|POPUP|WINDOW})
pToolbar→SetNumProperty("ButtonIndex",index)

Remarks

The button index must be set in order to override default button captions. Button indexes for volatile or fixed buttons are numbered from zero onwards.

To change the default caption for a menu item, set the Button Type property, set the ButtonIndex property to the index of the desired button, then set the ButtonCaption and/or ButtonPicture properties.

Data Type
Integer.

ButtonPicture Property, Toolbar Control
Description
Specifies a bitmap to display on a button/window.

Visual Basic
[form.]Toolbar.ButtonType[={Fixed|Volatile|Popup}]
[form.]Toolbar.ButtonIndex=index%
[form.]Toolbar.ButtonPicture[=picture]
[form.]Toolbar.ButtonType[={Window}]
[form.]Toolbar.WindowIndex=index%
[form.]Toolbar.SubWindowIndex=index%
[form.]Toolbar.ButtonPicture[=picture]

Visual C++
pToolbar→SetNumProperty("ButtonType", {FIXED|VOLATILE|POPUP })
pToolbar→SetNumProperty("ButtonIndex",index)
pToolbar→GetNumProperty("ButtonPicture")
pToolbar→SetNumProperty("ButtonPicture", picture)
pToolbar→SetNumProperty("ButtonType", {WINDOW})
pToolbar→SetNumProperty("Windowindex",index)
pToolbar→SetNumProperty("SubWindowIndex", index)
pToolbar→GetNumProperty("ButtonPicture")
pToolbar→SetNumProperty("ButtonPicture", picture)

Data Type
Integer.

ButtonCaption Property, Toolbar control
Description
Specifies a caption to display on a button.

Visual Basic
[form.]Toolbar.ButtonType[={Fixed|Popup|Window}]
[form.]Toolbar.ButtonIndex=index%
[form.]Toolbar.ButtonCaption[=caption$]

Visual C++
pToolbar→SetNumProperty("ButtonType", {FIXED|VOLATILE|POPUP|WINDOW})
pToolbar→SetNumProperty("ButtonIndex",index)
pToolbar→GetNumProperty("ButtonCaption")
pToolbar→SetNumProperty("ButtonCaption", caption)

Remarks

The popup menu button captions default to the captions that appear in the popup menu. Use the ButtonCaption property to override this caption.

Data Type
Integer.

ExitButtonVisible HelpButtonVisible, OkButtonVisible, CancelButtonVisible, PrintButtonVisible, SaveButton Visible, OpenButtonVisible, UndoButtonVisible, NextButtonVisible, PreviousButtonVisible Properties, Toolbar Control
Description
Determines if a predefined fixed button is visible or invisible at run time.

Visual Basic
[form.]Toolbar.HelpButtonVisible[={True|False}]
[form.]Toolbar.UndoButtonVisible[={True|False}]
[form.]Toolbar.PrintButtonVisible[={True|False}]
[form.]Toolbar.OpenButtonVisible[={True|False}]
[form.]Toolbar.SaveButtonVisible[={True|False}]
[form.]Toolbar.ExitButtonVisible[={True|False}]
[form.]Toolbar.OkButtonVisible[={True|False}]

```
[form.]Toolbar.CancelButtonVisible[={True|False}]
[form.]Toolbar.NextButtonVisible[={True|False}]
[form.]Toolbar.PreviousButtonVisible[={True|False}]
```
Visual C++
```
pToolbar→GetNumProperty ("HelpButtonVisible")
pToolbar→SetNumProperty("HelpButtonVisible",
    {TRUE|FALSE})
pToolbar→GetNumProperty("UndoButtonVisible")
pToolbar→SetNumProperty("UndoButtonVisible",
    {TRUE|FALSE})
pToolbar→GetNumProperty("PrintButtonVisible")
pToolbar→SetNumProperty ("PrintButtonVisible",
    {TRUE|FALSE})
pToolbar→GetNumProperty("OpenButtonVisible")
pToolbar→SetNumProperty("OpenButtonVisible",
    {TRUE|FALSE})
pToolbar→GetNumProperty("SaveButtonVisible")
pToolbar→SetNumProperty("SaveButtonVisible",
    {TRUE|FALSE})
pToolbar→GetNumProperty("ExitButtonVisible")
pToolbar→SetNumProperty("ExitButtonVisible",
    {TRUE|FALSE})
pToolbar→GetNumProperty("OkButtonVisible")
pToolbar→SetNumProperty("OkButtonVisible",
    {TRUE|FALSE})
pToolbar→GetNumProperty("CancelButtonVisible")
pToolbar→SetNumProperty
    ("CancelButtonVisible", {TRUE|FALSE})
pToolbar→GetNumProperty("NextButtonVisible")
pToolbar→SetNumProperty("NextButtonVisible",
    {TRUE|FALSE})
pToolbar→GetNumProperty("PreviousButton
    Visible")
pToolbar→SetNumProperty("PreviousButton
    Visible", {TRUE|FALSE})
```
Remarks The predefined fixed buttons appear in the right hand end fixed section of the toolbar. They have predefined captions, and generate predefined events, such as Help Click.

Data Type
  Integer (Boolean).

WindowIndex, SubWindowIndex Properties, Toolbar Control

Description

Sets or returns the currently selected window or sub-window.

Visual Basic
```
[form.]Toolbar.ButtonType[={Window}]
[form.]Toolbar.WindowIndex[=index%]
[form.]Toolbar.SubWindowIndex[=index%]
```
Visual C++
```
pToolbar→SetNumProperty("ButtonType",
    {WINDOW})
pToolbar→SetNumProperty("WindowIndex", index)
pToolbar→SetNumProperty("SubWindowIndex",
    index)
```
Remarks The window index and sub-window index can be used to both set and get the currently selected windows. The indexes are numbered from zero, −1 means no current selection. It is necessary to set the indexes in order add new windows and menus to the structure of the toolbar, and also to override default button captions.

Data Type
  Integer.

While the best mode for carrying out the invention has been described in detail, those familiar with the art to which this invention relates will recognize various alternative designs and embodiments for practicing the invention as defined by the following claims.

What is claimed is:

1. A method for quickly developing application software for use in a machine vision system using an open computer system operating in an open programming environment, the method comprising the steps of:

storing an application development program, including a first set of custom control programs representing possible components of a user interface for the machine vision system, the first set of custom control programs defining a first set of custom controls obeying an open standard which defines properties for programming the first set of custom controls;

storing a second set of custom control programs representing possible machine vision algorithms for the machine vision system, the second set of custom control programs defining a second set of custom controls obeying the open standard which defines properties for programming the second set of custom controls;

storing hardware operating parameters corresponding to possible hardware for use in the machine vision system, the hardware operating parameters defining a third set of custom controls obeying the open standard which defines properties for programming the third set of custom controls;

displaying graphical representations of the possible components, the possible hardware and the possible machine vision algorithms;

receiving commands from a user of the open computer system to select a first custom control program corresponding to a desired component of the user interface, desired hardware operating parameters corresponding to desired hardware and a second custom control program corresponding to a desired machine vision algorithm; and linking the first custom control program with the desired hardware operating parameters to the second custom control program to form the application software in response to the commands wherein the step of linking includes the step of setting the properties of the custom controls of the selected programs and hardware operating parameters.

2. The method as claimed in claim 1 wherein the step of setting includes the step of setting one property of one custom control to be equal to one property of another custom control.

3. The method as claimed in claim 1 wherein the step of linking includes the step of receiving a set of instructions from the user of the open computer system.

4. The method as claimed in claim 1 further comprising the steps of:

storing a third set of custom control programs representing possible software products for use in a machine vision system; and displaying a graphical representation of the possible software products, wherein the step of linking links a third custom control program corresponding to a desired software product with the first and second custom control programs and the desired hardware operating parameters in response to the commands to form the application software.

5. The method as claimed in claim 1 wherein the desired hardware operating parameters correspond to a desired image source of the machine vision system.

6. The method as claimed in claim 5 wherein the desired image source is a camera.

7. The method as claimed in claim 5 wherein the desired operating parameters further correspond to a desired vision processor board of the machine vision system.

8. The method as claimed in claim 5 wherein the desired hardware operating parameters further correspond to a desired frame grabber board of the machine vision system.

9. The method as claimed in claim 5 wherein the desired hardware operating parameters further correspond to a desired motion board of the machine vision system.

10. The method as claimed in claim 5 wherein the desired hardware operating parameters further correspond to a desired bus of the machine vision system.

11. The method as claimed in claim 5 wherein the desired machine vision algorithm is an image processing algorithm.

12. The method as claimed in claim 5 wherein the desired machine vision algorithm is an image-analysis algorithm.

13. The method as claimed in claim 5 wherein the desired machine vision algorithm is a calibration space algorithm.

14. The method as claimed in claim 5 wherein the desired machine vision algorithm is an interactive CAD/geometry algorithm.

15. The method as claimed in claim 5 wherein the open computer system includes a personal computer.

16. An open computer system operating in an open programming environment for quickly developing application software for use in a machine vision system, the system comprising:

means for storing an application development program, including a first set of custom control programs representing possible components of a user interface for the machine vision system, the first set of custom control programs defining a first set of custom controls obeying an open standard which defines properties for programming the first set of custom controls;

means for storing a second set of custom control programs representing possible machine vision algorithms for the machine vision system, the second set of custom control programs defining a second set of custom controls obeying the open standard which defines properties for programming the second set of custom controls;

means for storing hardware operating parameters corresponding to possible hardware for use in the machine vision system, the hardware operating parameters defining a third set of custom controls obeying the open standard which defines properties for programming the third set of custom controls;

means for displaying graphical representations of the possible components, the possible hardware and the possible machine vision algorithms;

means for receiving commands from a user of the open computer system to select a first custom control program corresponding to a desired component of the user interface, desired hardware operating parameters corresponding to desired hardware and a second custom control program corresponding to a desired machine vision algorithm; and means for linking the first custom control program with the desired hardware operating parameters to the second custom control program to form the application software in response to the commands wherein the means for linking includes means for setting the properties of custom controls of the selected programs and hardware operating parameters.

17. The computer system as claimed in claim 15 wherein the means for setting sets one property of one custom control to be equal to one property of another custom control.

18. The computer system as claimed in claim 16 wherein the means for linking includes means for receiving a set of instructions from the user of the computer system.

19. The computer system as claimed in claim 16 further comprising:

means for storing a third set of custom control programs representing possible software products for use in a machine vision system; and means for displaying a graphical representation of the possible software products, wherein the means for linking links a third custom control program corresponding to a desired software product with the first and second custom control programs and the desired hardware operating parameters in response to the commands to form the application software.

20. The computer system as claimed in claim 16 wherein the desired hardware operating parameters correspond to a desired image source of the machine vision system.

21. The computer system as claimed in claim 20 wherein the desired image source is a camera.

22. The computer system as claimed in claim 20 wherein the desired operating parameters further correspond to a desired vision processor board of the machine vision system.

23. The computer system as claimed in claim 20 wherein the desired hardware operating parameters further correspond to a desired frame grabber board of the machine vision system.

24. The computer system as claimed in claim 20 wherein the desired hardware operating parameters further correspond to a desired motion board of the machine vision system.

25. The computer system as claimed in claim 20 wherein the desired hardware operating parameters further correspond to a desired bus of the machine vision system.

26. The computer system as claimed in claim 20 wherein the desired machine vision algorithm is an image processing algorithm.

27. The computer system as claimed in claim 20 wherein the desired machine vision algorithm is an image-analysis algorithm.

28. The computer system as claimed in claim 20 wherein the desired machine vision algorithm is a calibration space algorithm.

29. The computer system as claimed in claim 20 wherein the desired machine vision algorithm is an interactive CAD/geometry algorithm.

30. The computer system as claimed in claim 20 wherein the open computer system includes a personal computer.

\* \* \* \* \*